No. 885,916. PATENTED APR. 28, 1908.
W. D. FERRIS.
BALE TIE MAKING MACHINE.
APPLICATION FILED MAR. 6, 1907.
21 SHEETS—SHEET 3.
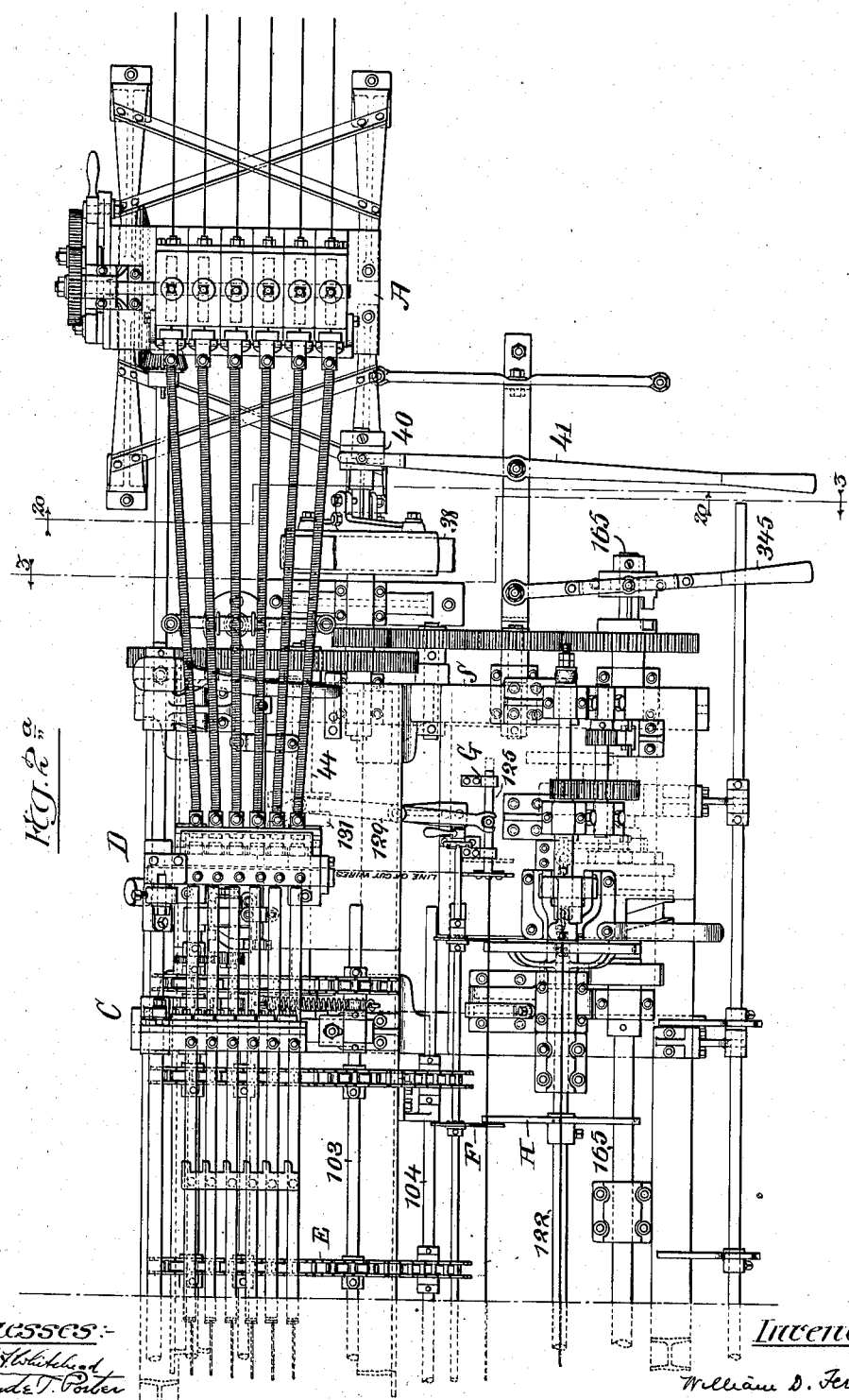

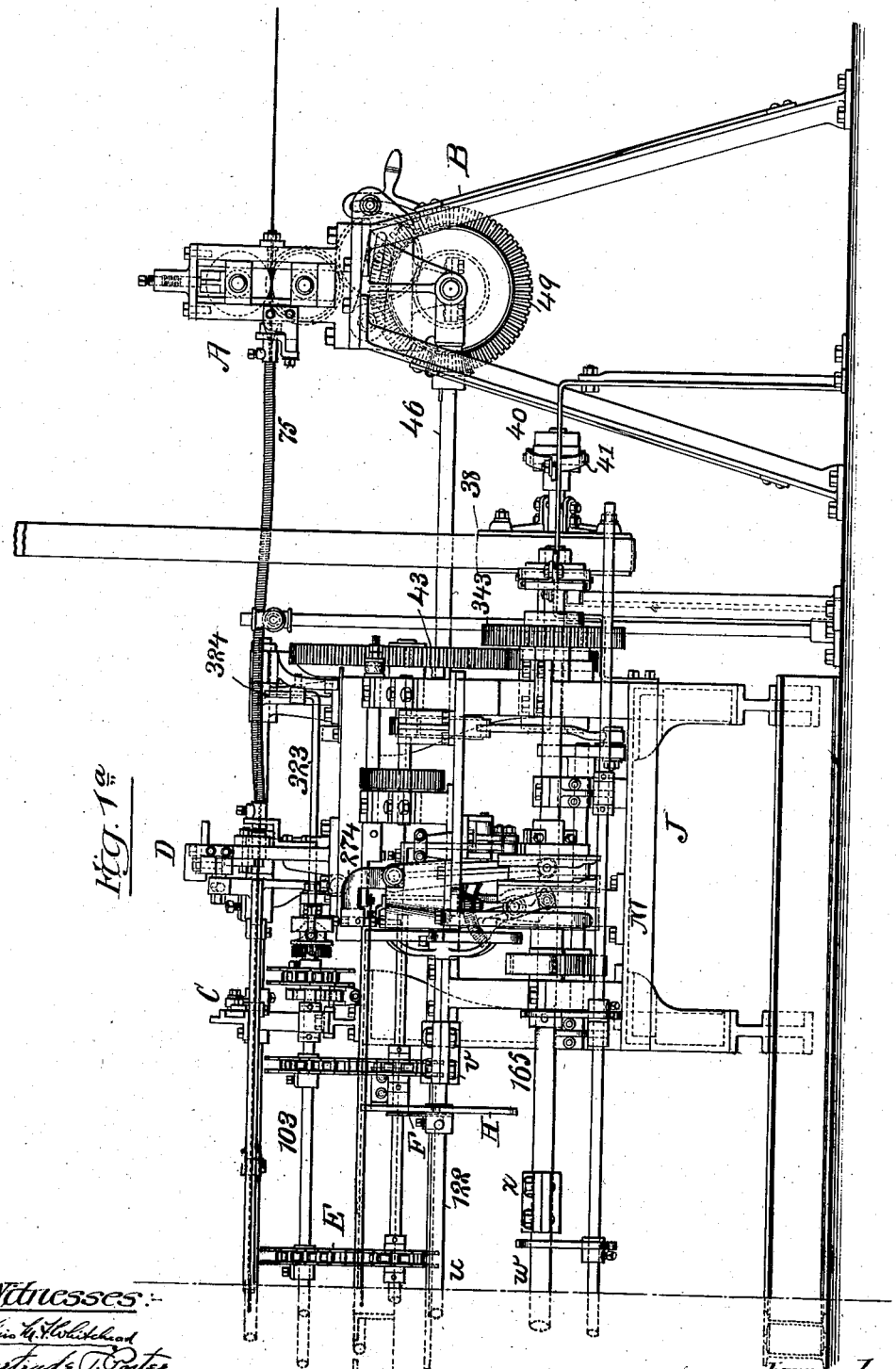

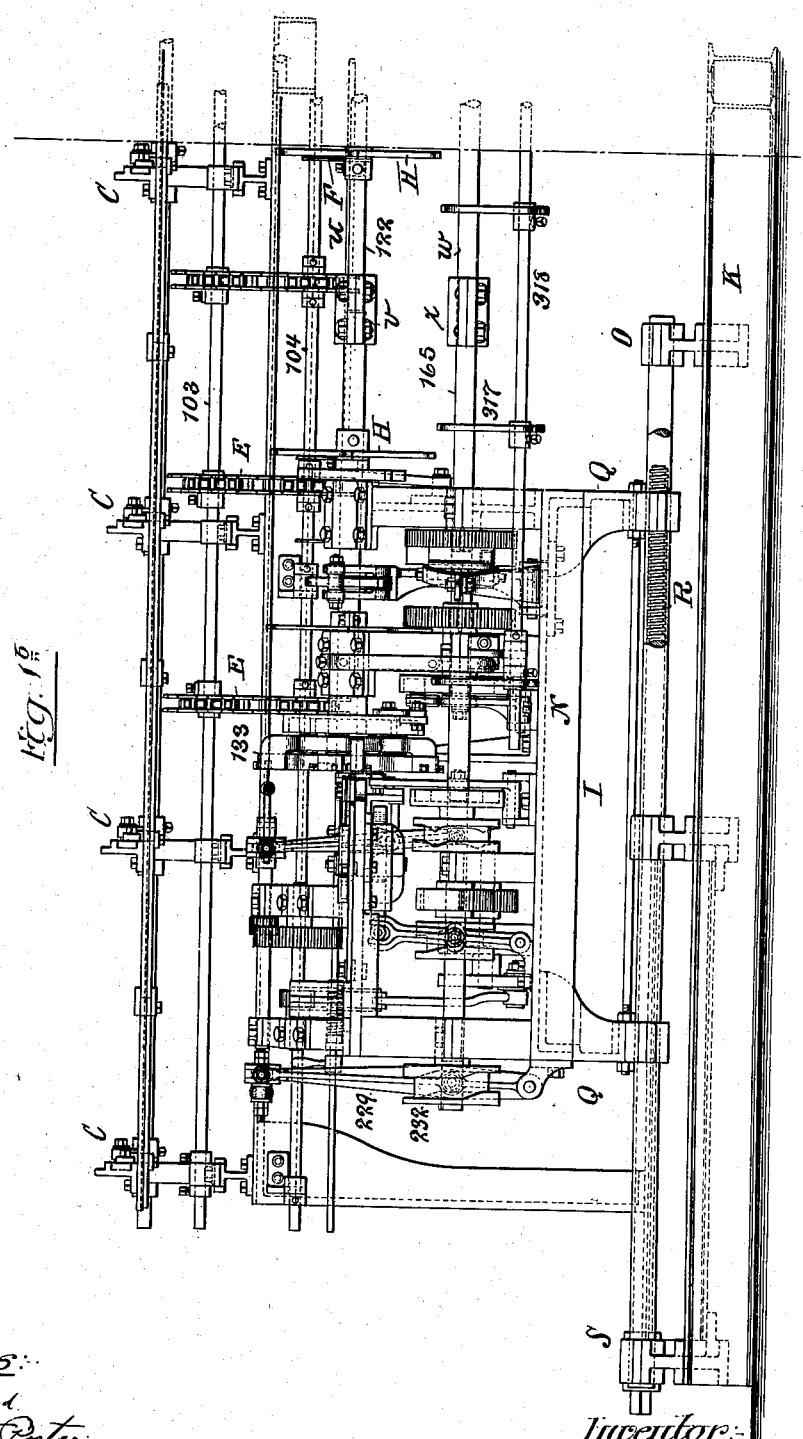

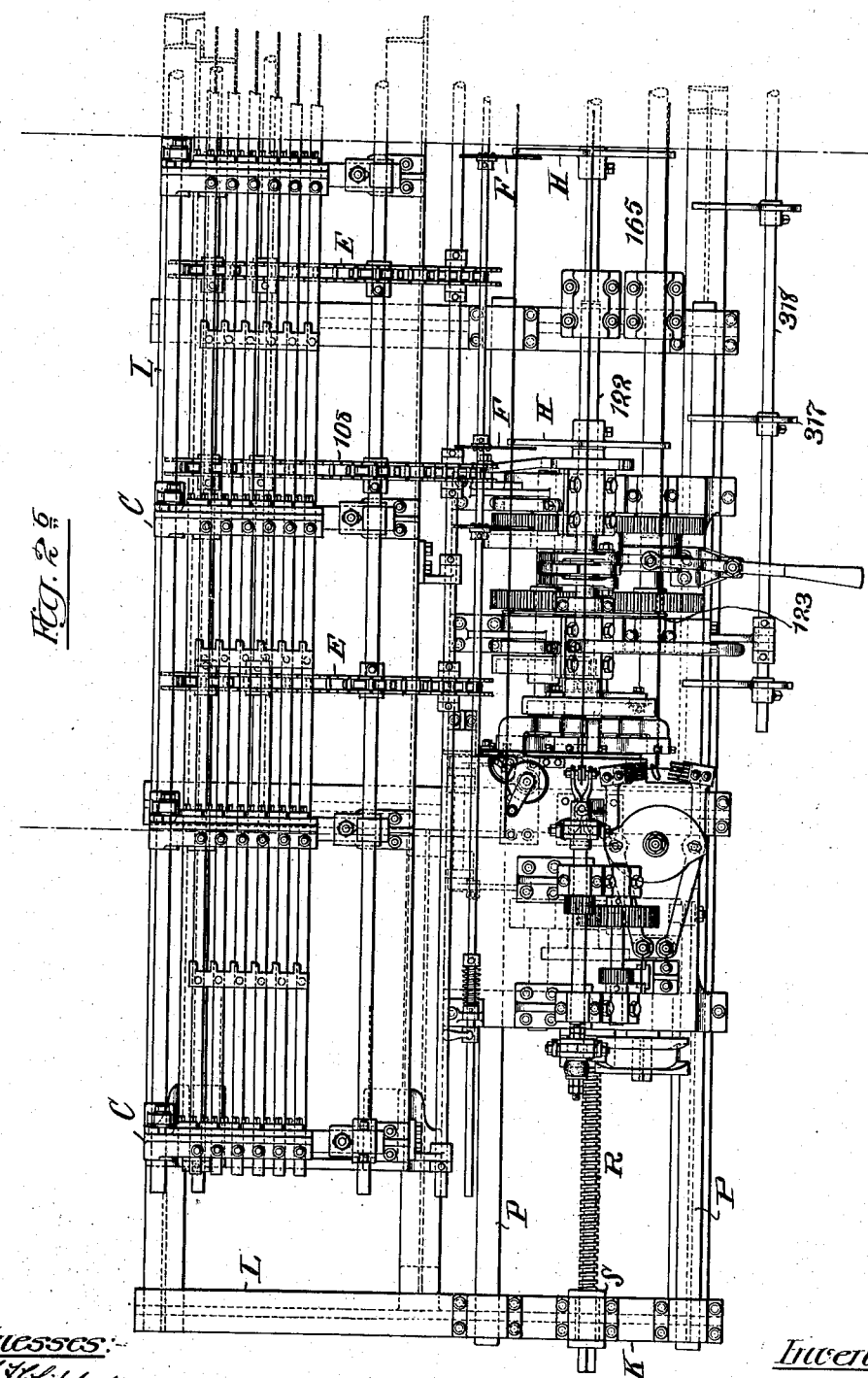

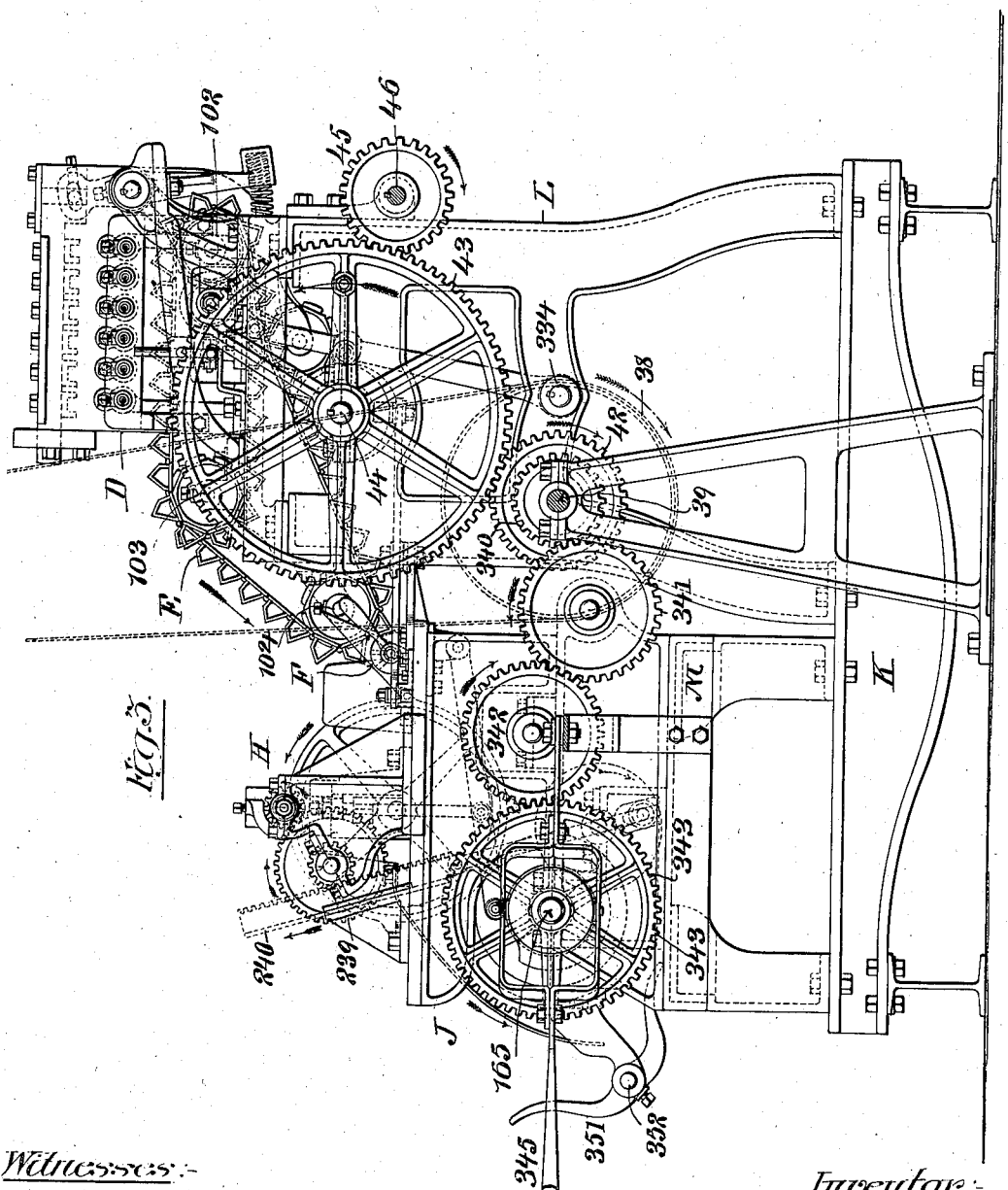

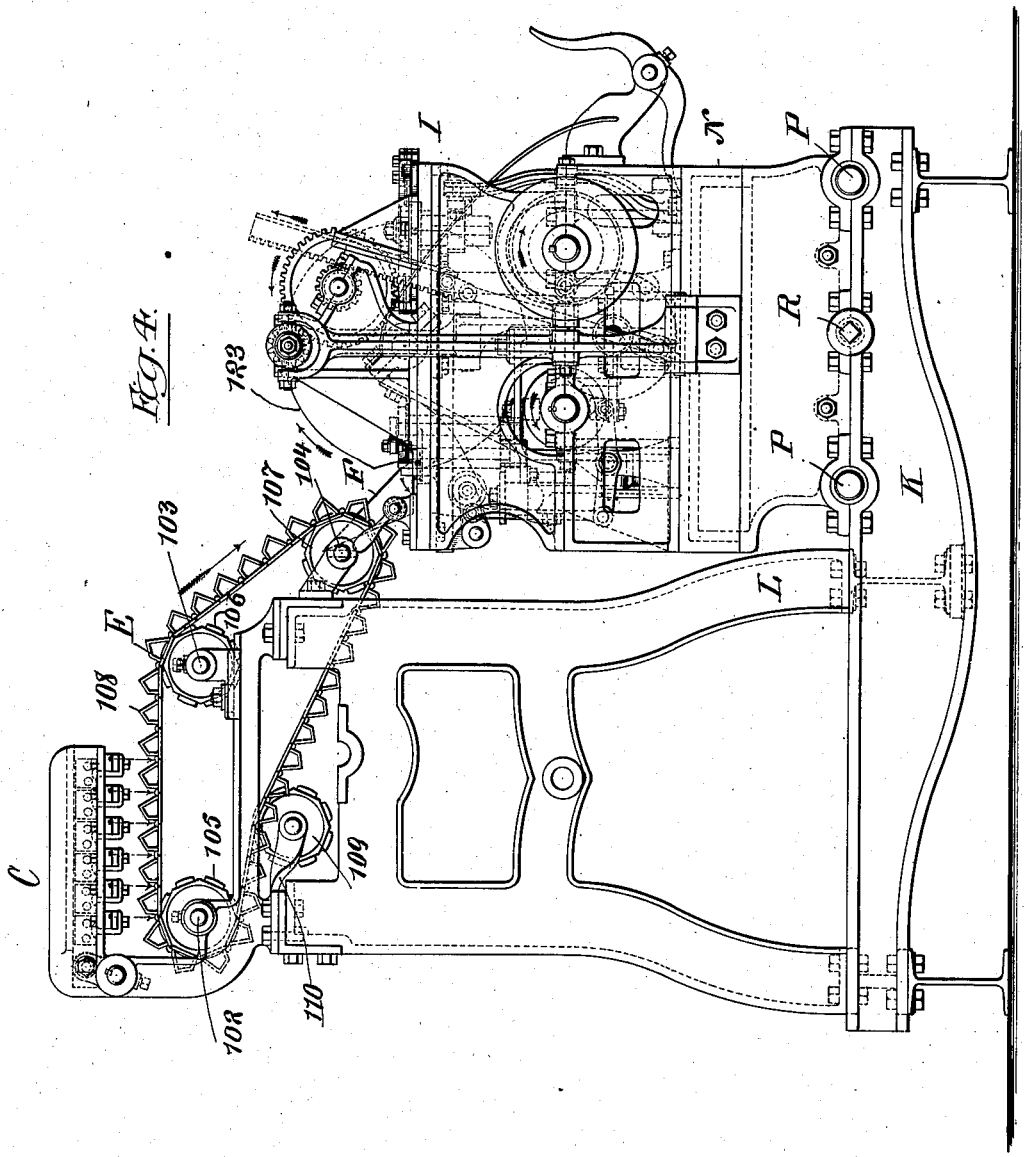

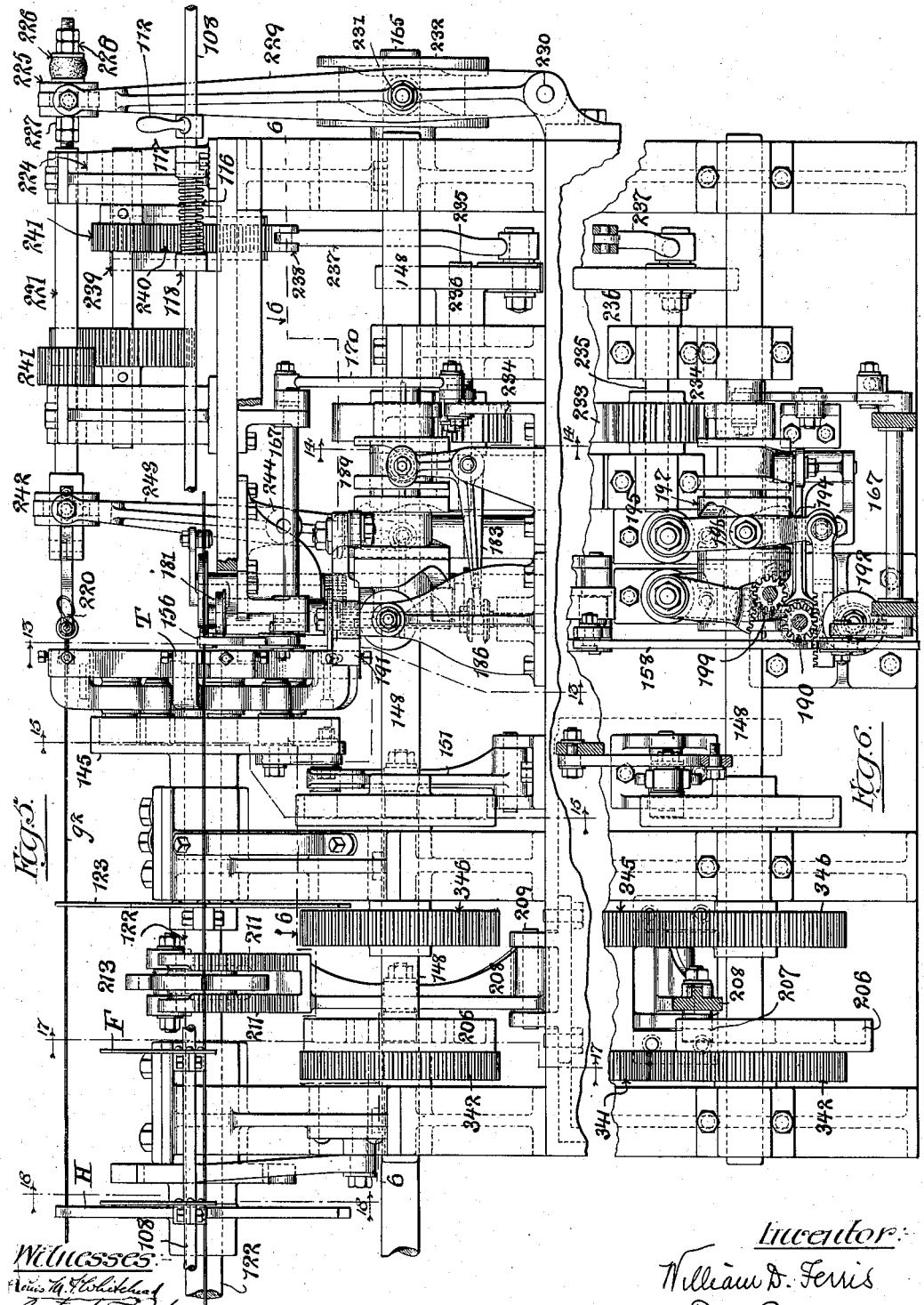

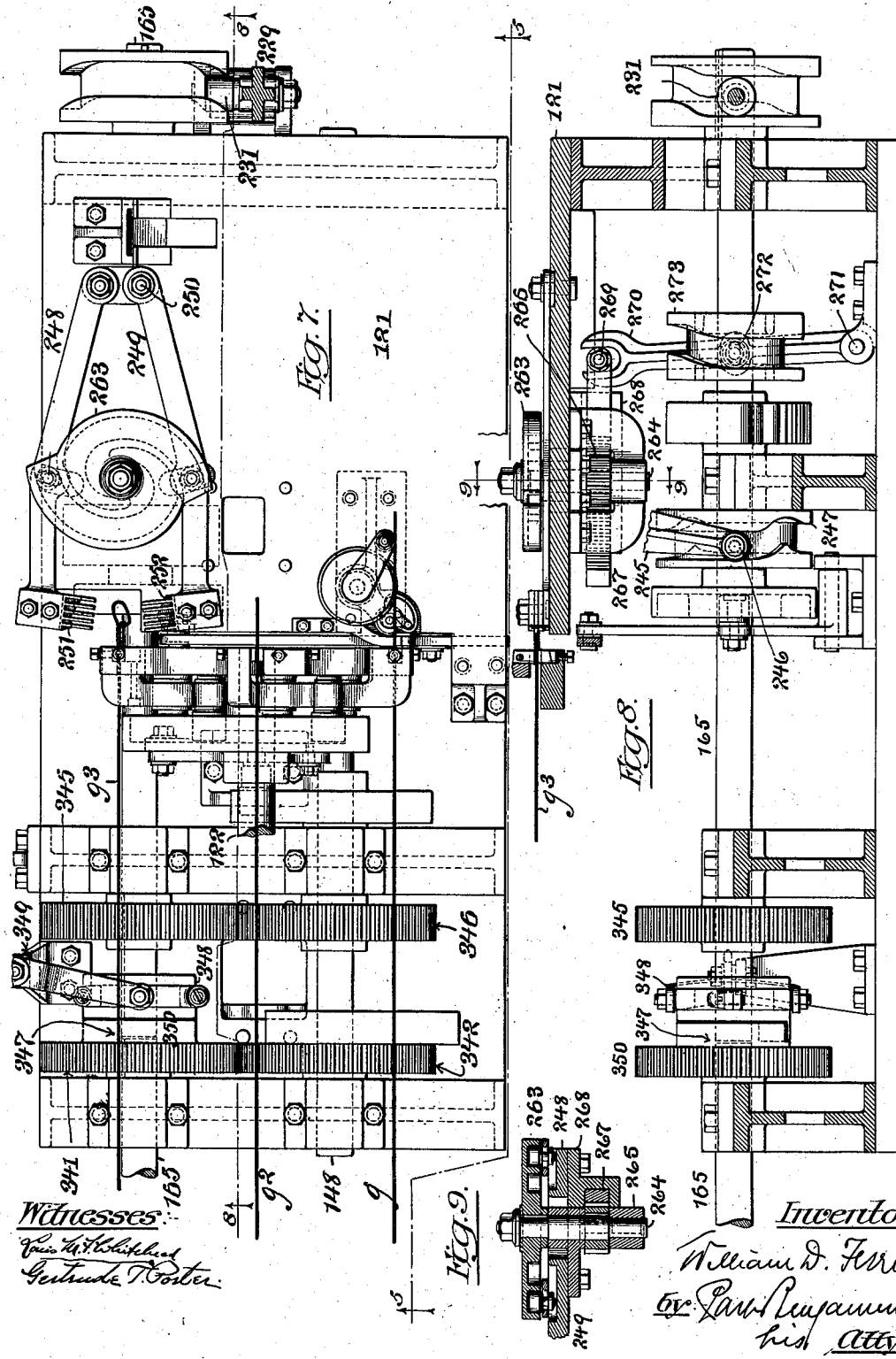

No. 885,916. PATENTED APR. 28, 1908.
W. D. FERRIS.
BALE TIE MAKING MACHINE.
APPLICATION FILED MAR. 6, 1907.
21 SHEETS—SHEET 9.
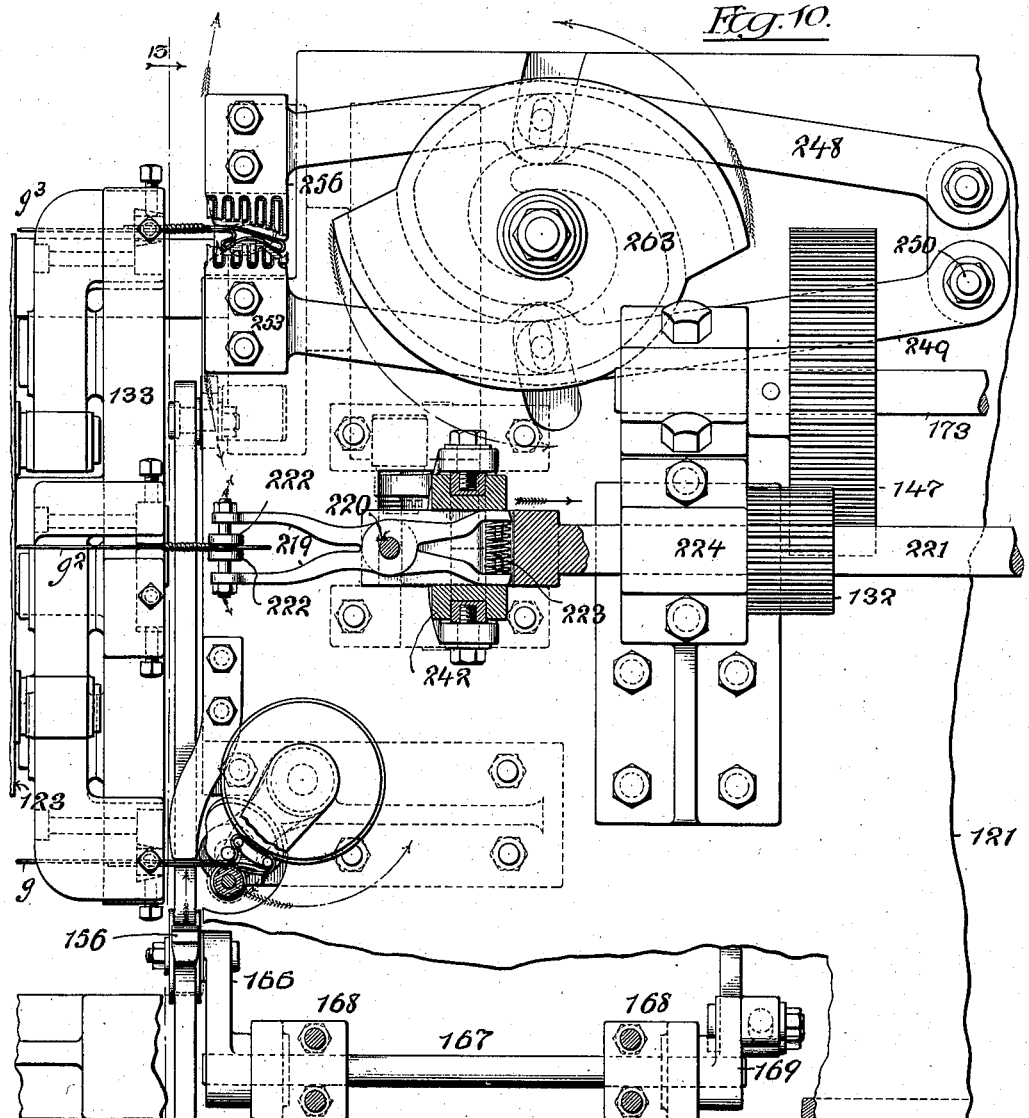
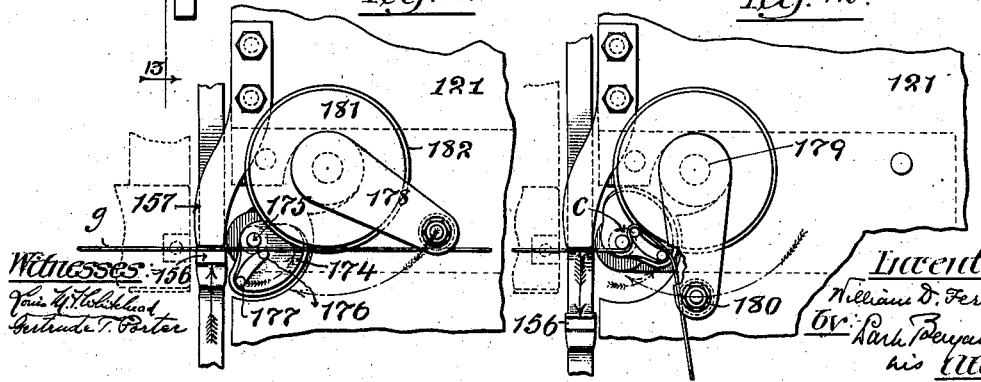

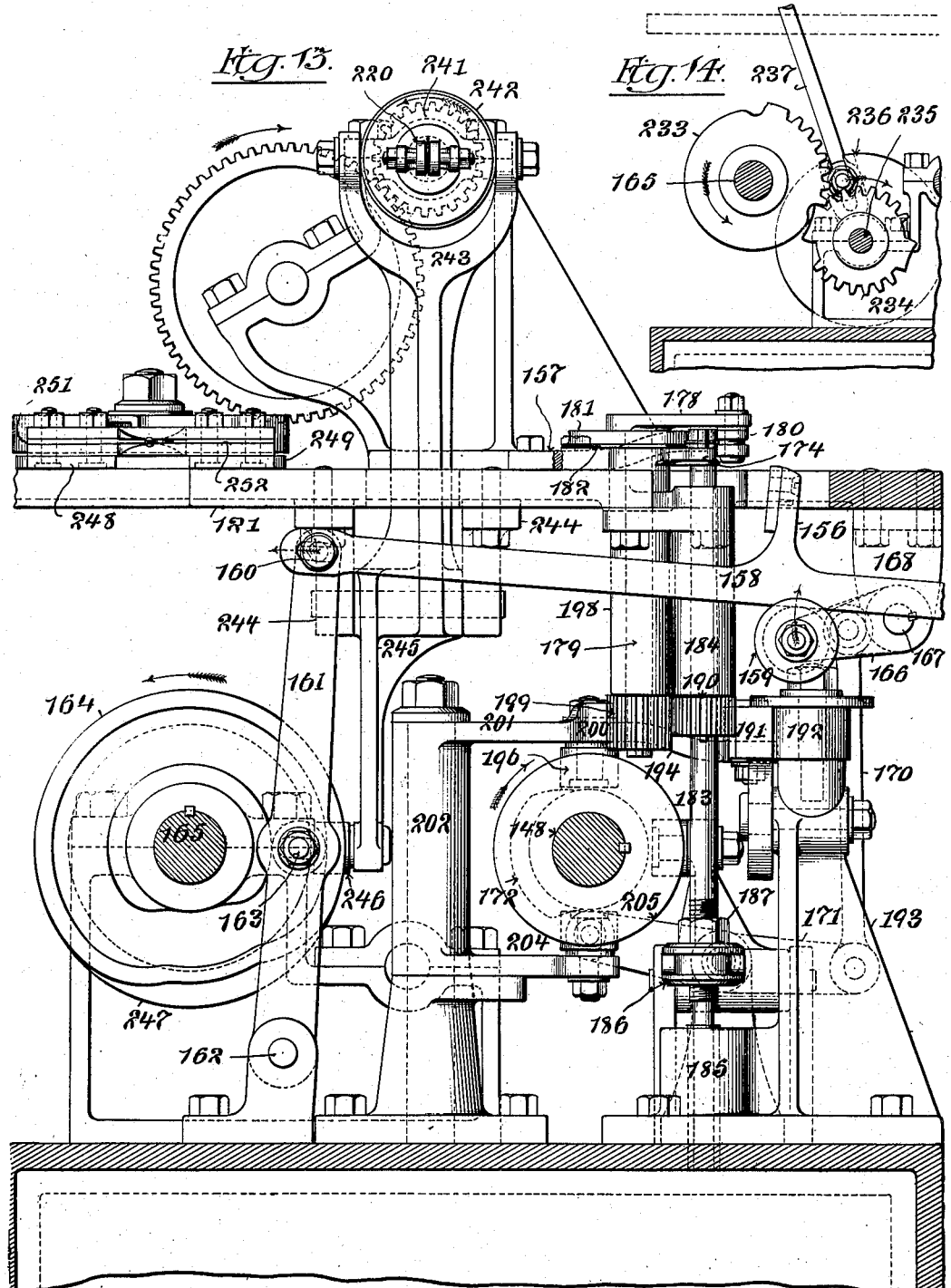

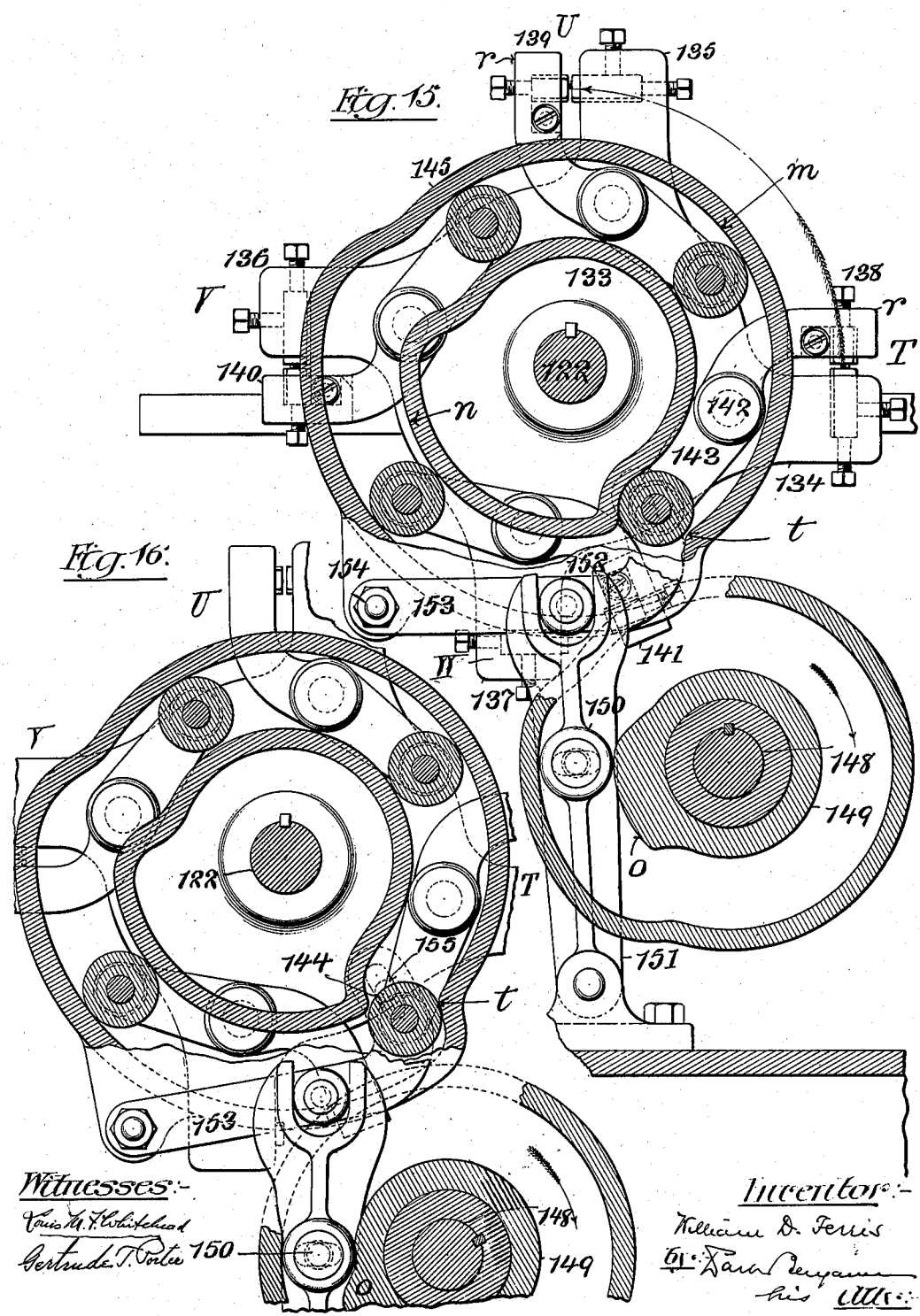

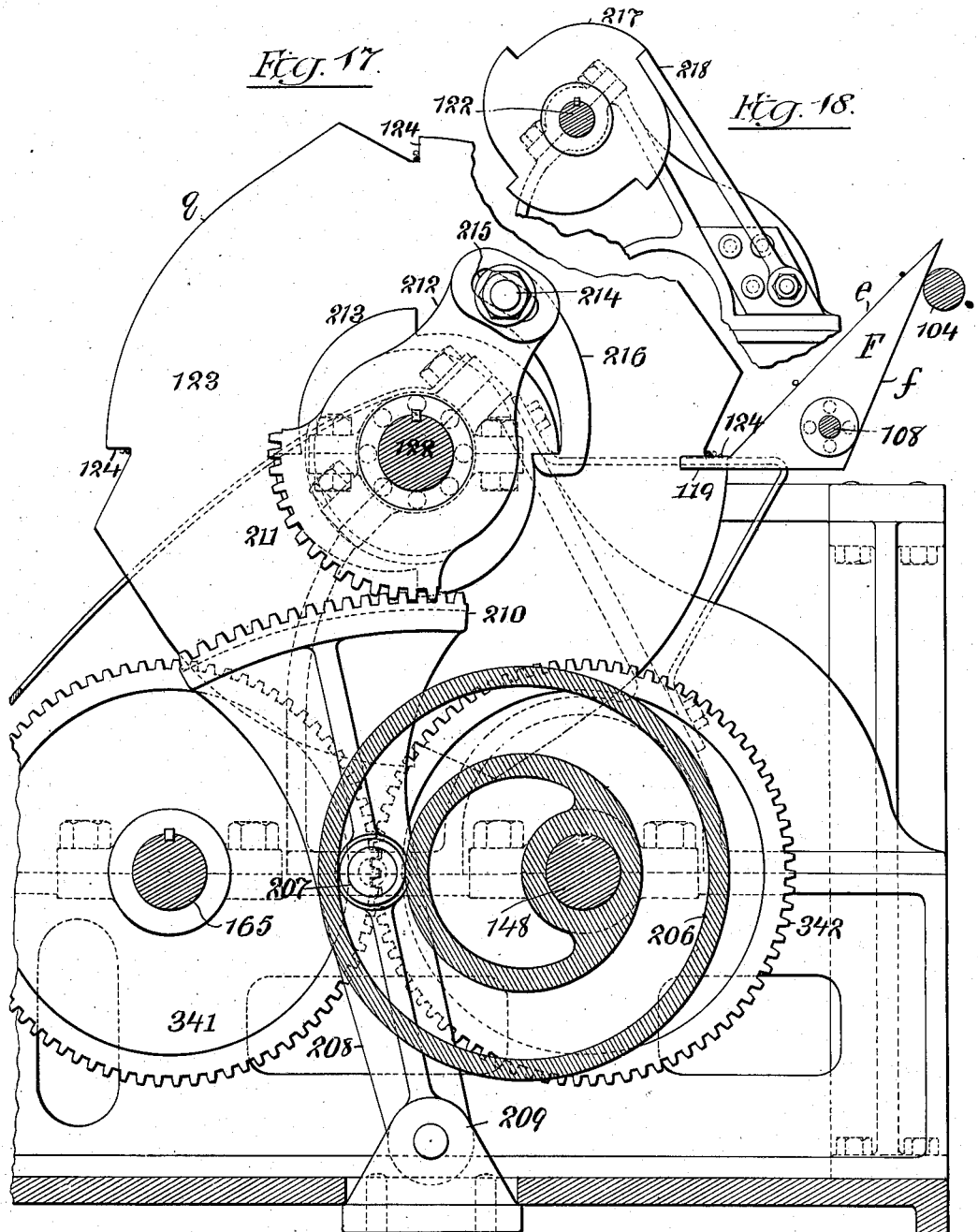

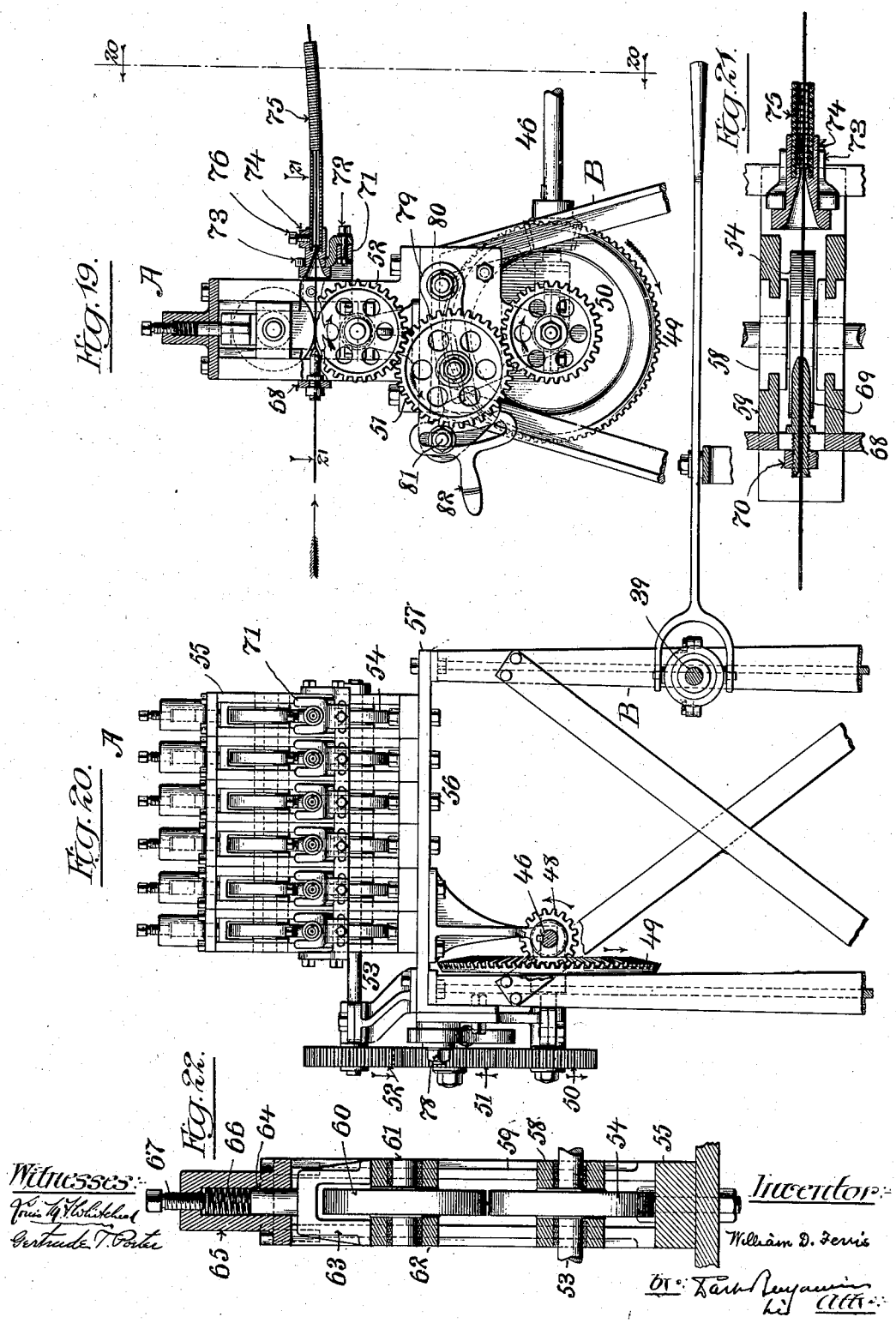

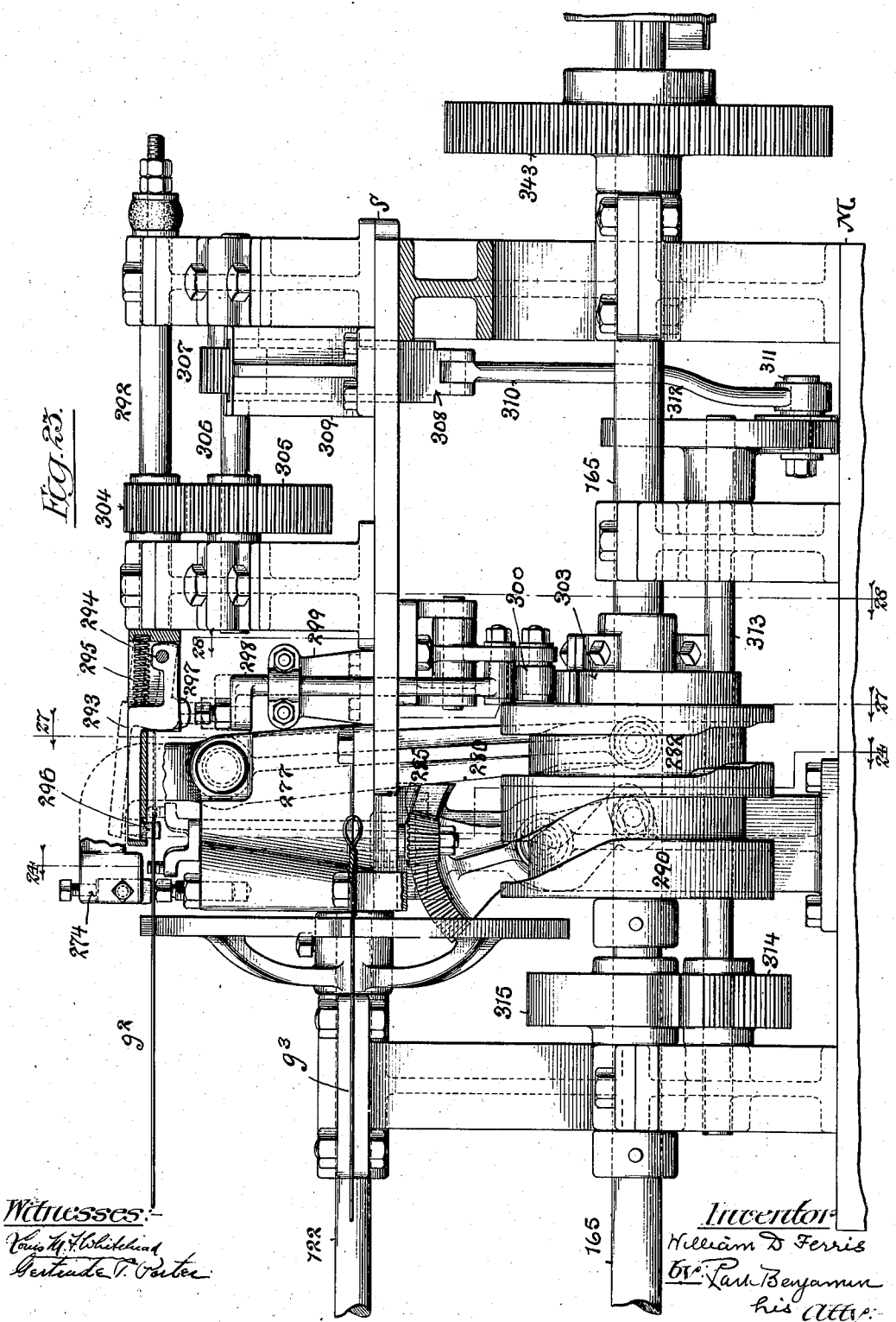

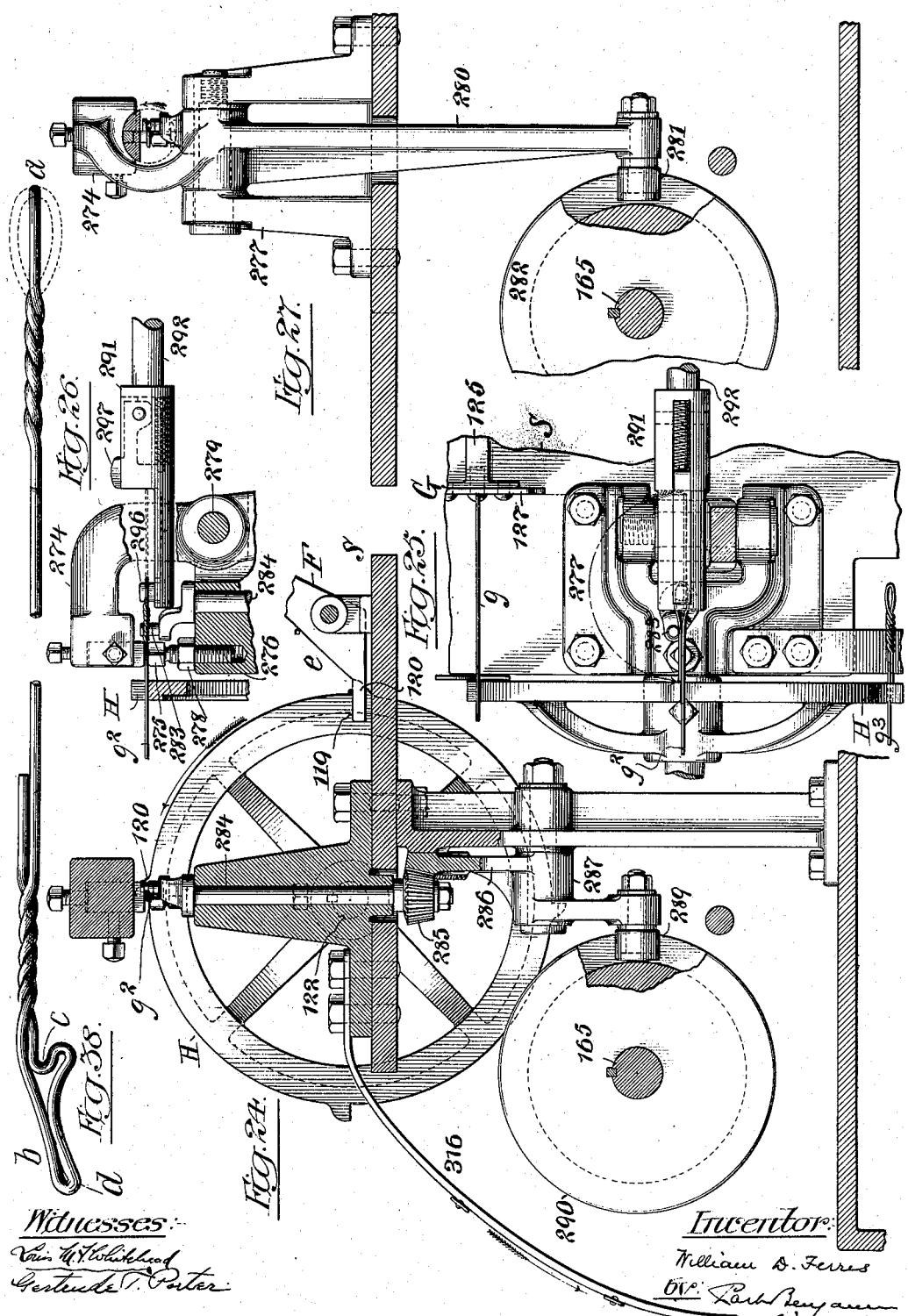

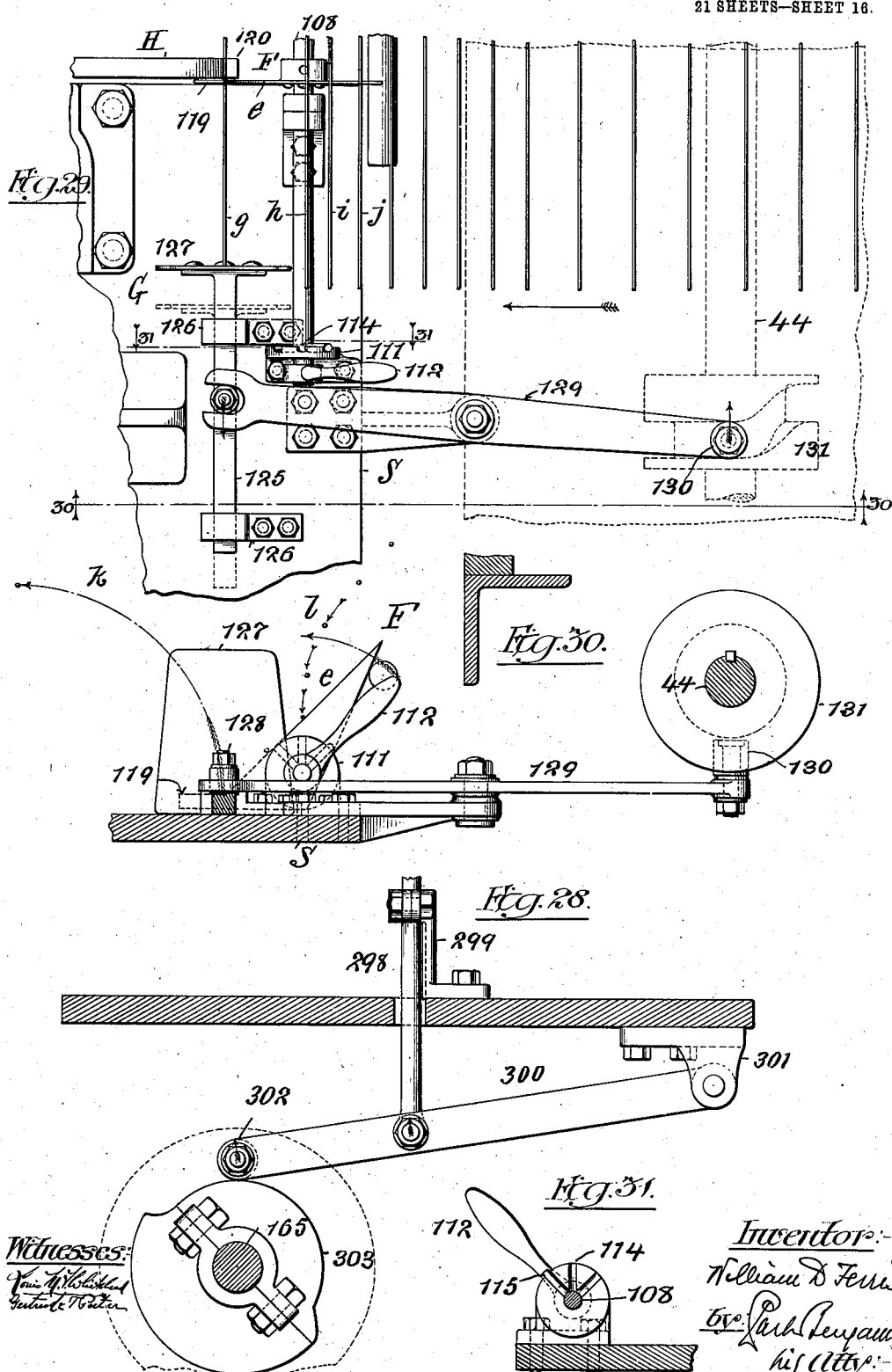

No. 885,916. PATENTED APR. 28, 1908.
W. D. FERRIS.
BALE TIE MAKING MACHINE.
APPLICATION FILED MAR. 6, 1907.
21 SHEETS—SHEET 17.
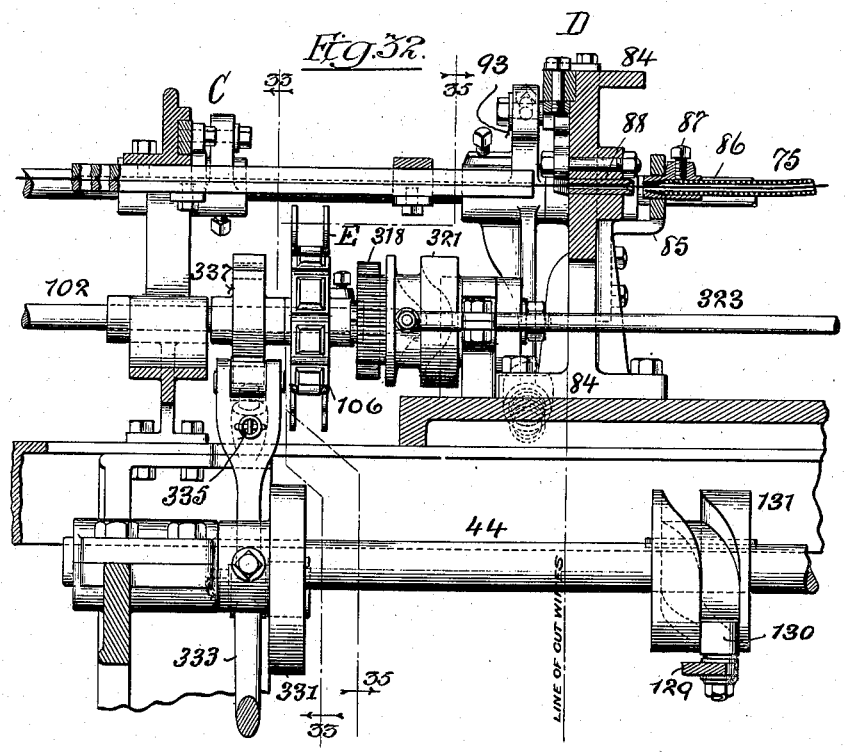
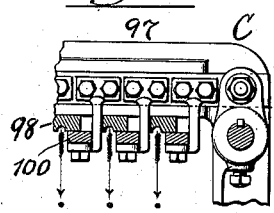
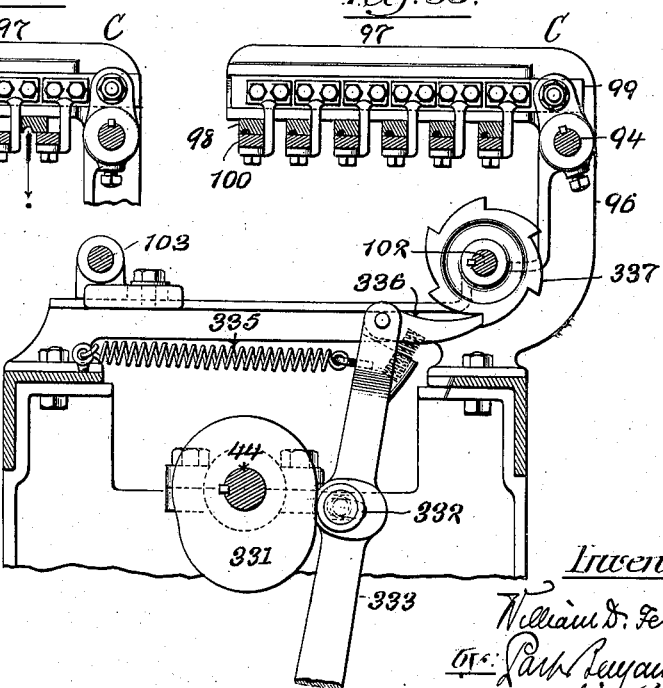
Witnesses:—
Inventor:—
William D. Ferris

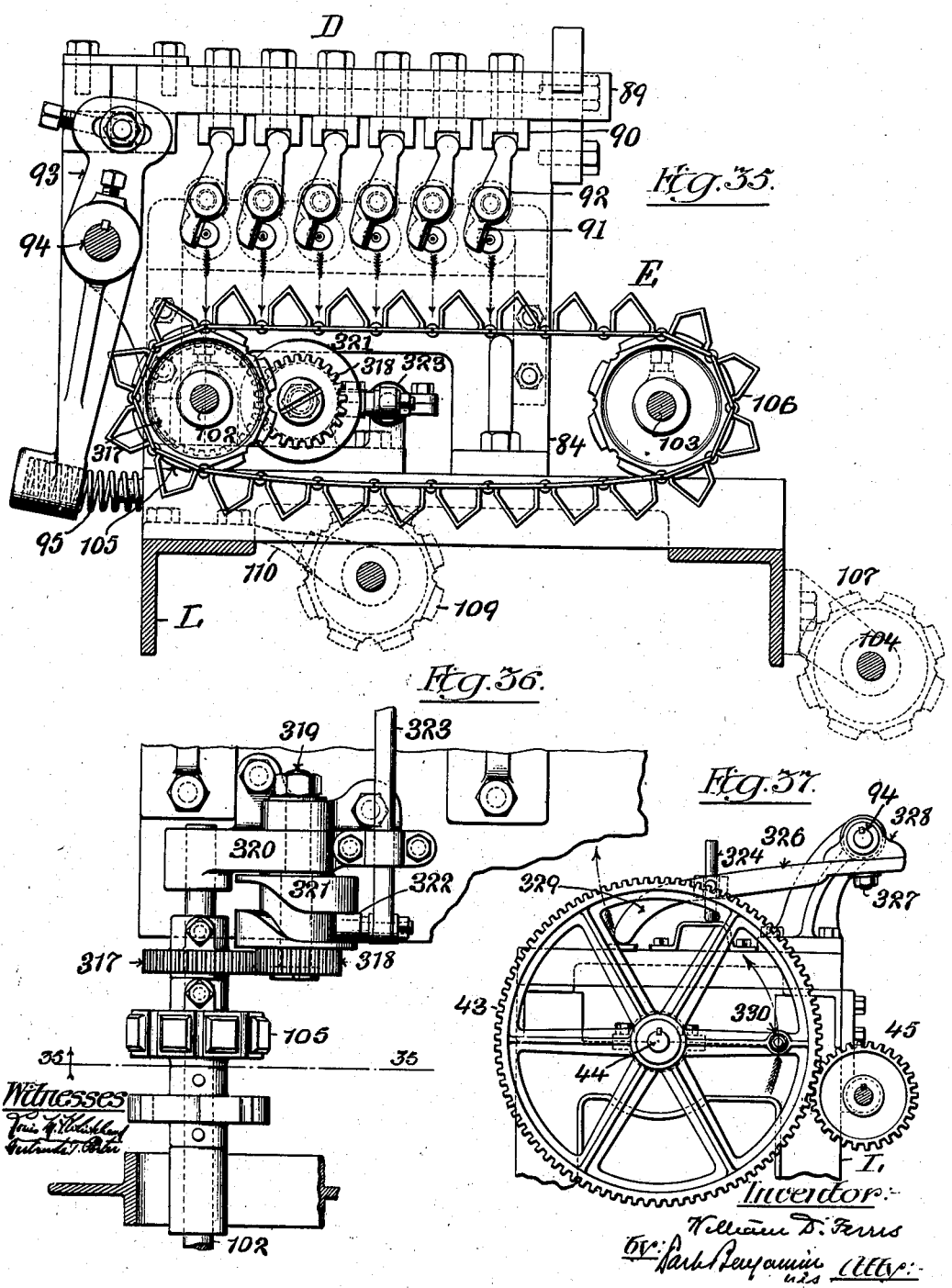

No. 885,916.
W. D. FERRIS.
BALE TIE MAKING MACHINE.
APPLICATION FILED MAR. 6, 1907.
PATENTED APR. 28, 1908.
21 SHEETS—SHEET 19.
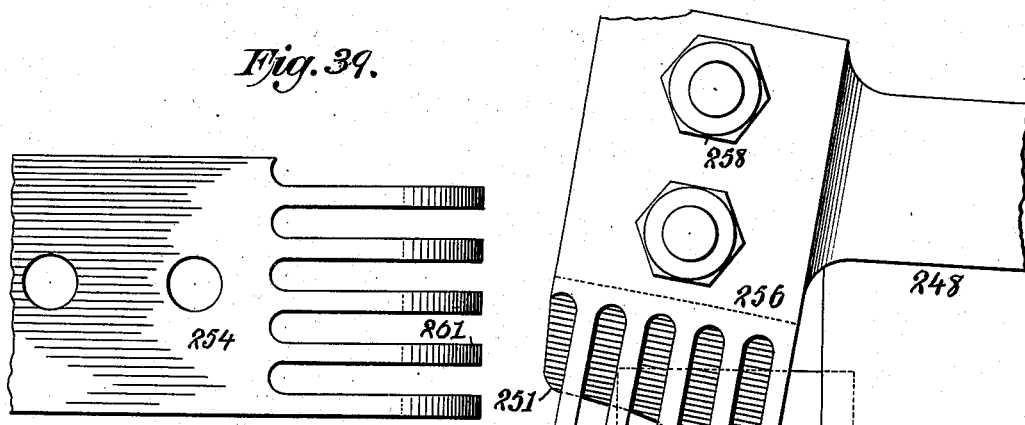
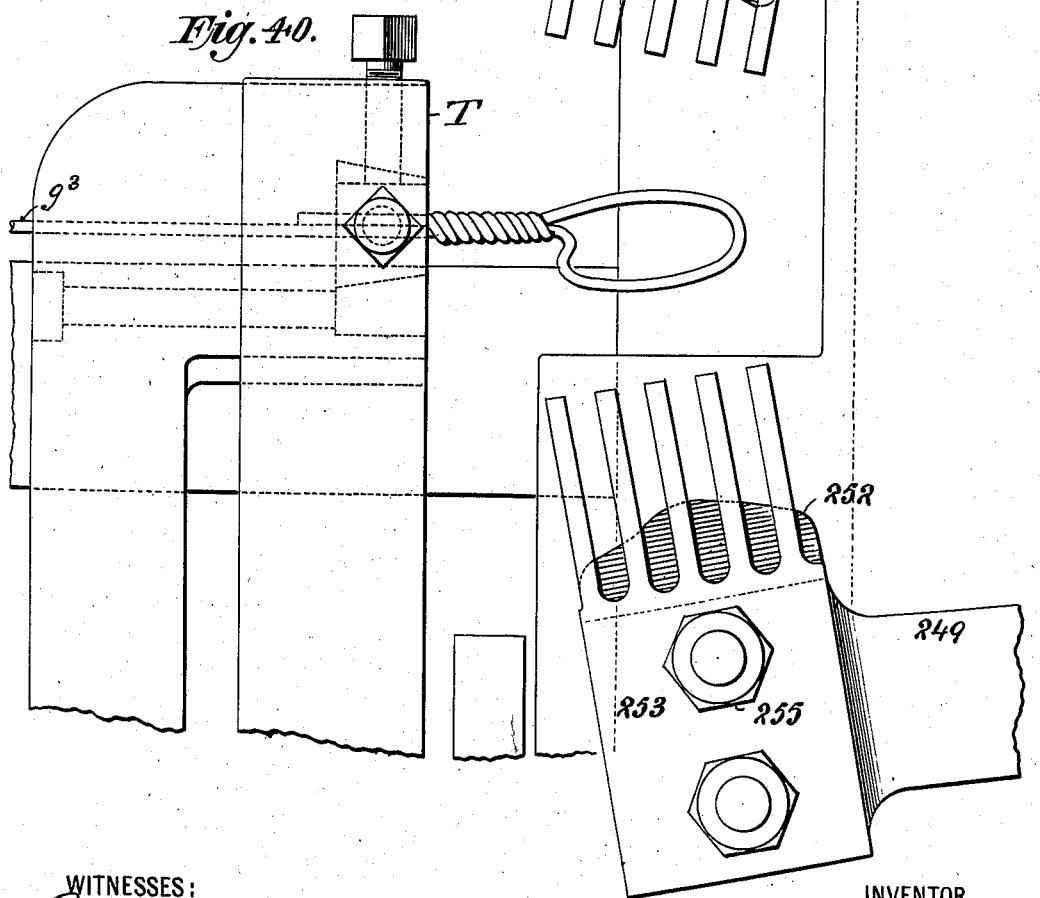
WITNESSES:
INVENTOR
William D. Ferris
BY
his ATTORNEY No. 885,916. PATENTED APR. 28, 1908.
W. D. FERRIS.
BALE TIE MAKING MACHINE.
APPLICATION FILED MAR. 6, 1907.
21 SHEETS—SHEET 20.
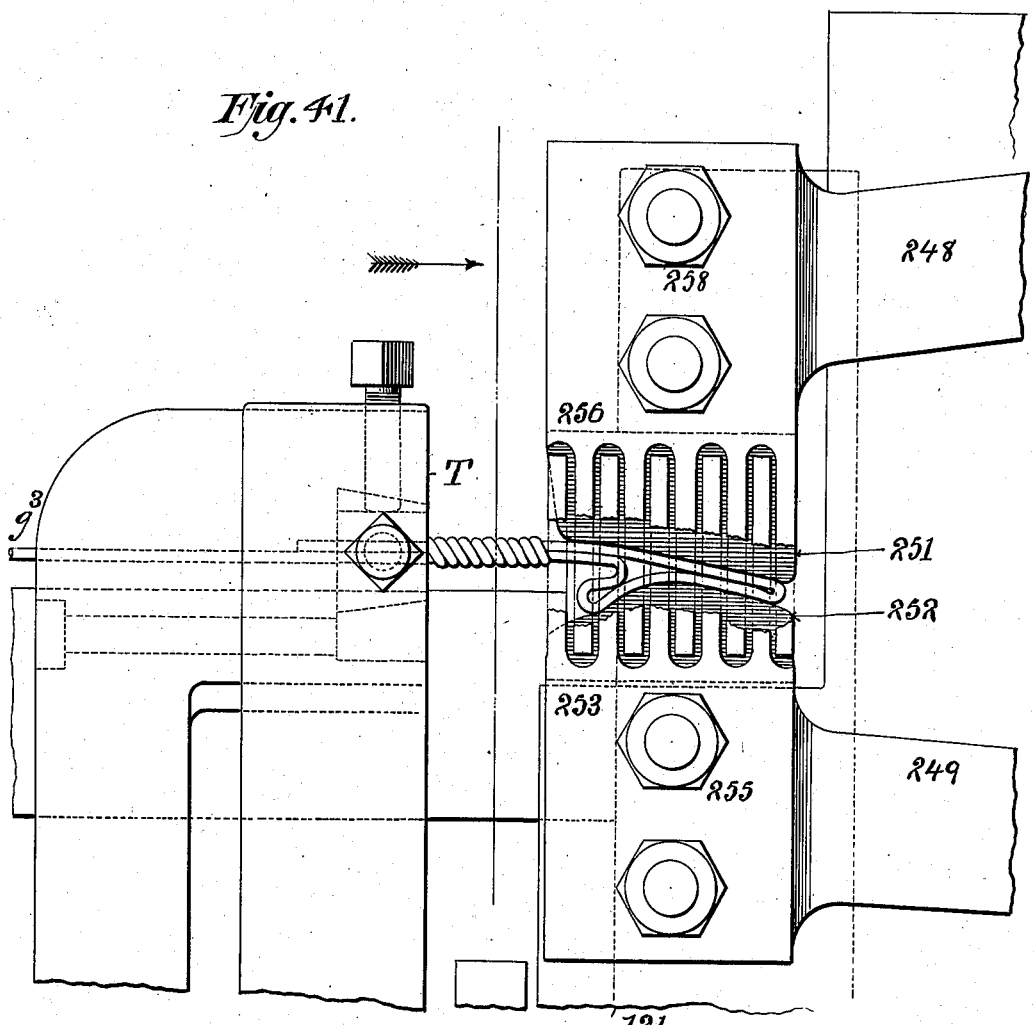
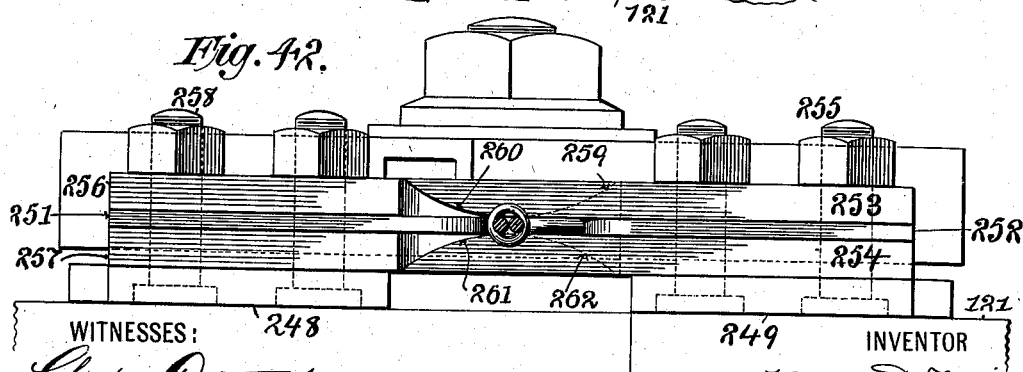
WITNESSES:
INVENTOR
William D. Ferris
BY
his ATTORNEY

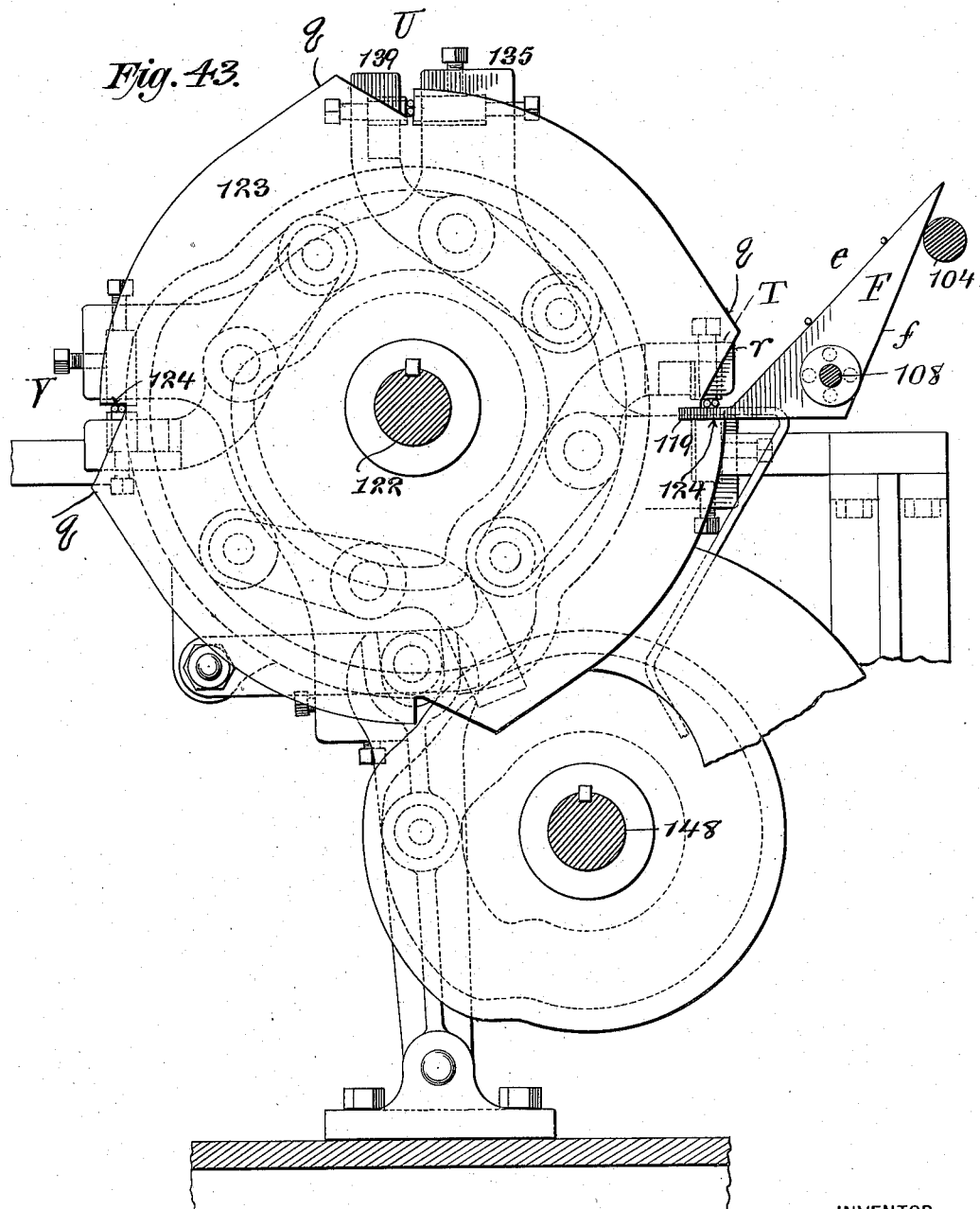

UNITED STATES PATENT OFFICE.

WILLIAM D. FERRIS, OF STERLING, ILLINOIS.

BALE-TIE-MAKING MACHINE.

No. 885,916.            Specification of Letters Patent.            Patented April 28, 1908.

Application filed March 6, 1907.   Serial No. 360,913.

*To all whom it may concern:*

Be it known that I, WILLIAM D. FERRIS, a citizen of the United States, residing at Sterling, in the county of Whiteside and State of Illinois, have invented a certain new and useful Improvement in Bale-Tie-Making Machines, of which the following is a specification.

The invention is a machine for making bale ties from wire strands; and it consists in improvements in and additions to the mechanism set forth in U. S. Patent No. 834,050, granted to me October 23, 1906. The said improvements and additions are designed to render the machine capable of making ties having, at one end, a specially formed cross head, and a single eye or loop at the other end for receiving said cross head when the tie is in place on the bale.

The principal novel features of the invention reside in the construction and arrangement of the cross-head forming devices, of the revolving vise, of the means for simultaneously forming eye and cross head at opposite ends of the tie, together with the various combinations and instrumentalities more particularly set forth in the claims.

In the accompanying drawings—Figure 1a is a front elevation of the right-hand end and Fig. 1b is a front elevation of the left-hand end of the machine; these two drawings taken together showing the entire machine. Fig. 2a is a plan view of the right-hand end and Fig. 2b a plan view of the left-hand end of the machine; these two drawings taken together showing the entire machine. Fig. 3 is a section on the line 3—3 of Fig. 2a. Fig. 4 is an elevation of the left hand end of the machine. Fig. 5 is a section on the line 5—5 of Fig. 7. Fig. 6 is a section on the line 6—6 of Fig. 5; the finger bar 156, which is above the plane of the section, being shown in place. Fig. 7 is a plan view of the platform 121 of the frame N showing the revolving vise and the cross head forming mechanism; certain parts being in horizontal section. Fig. 8 is a section on the line 8—8 of Fig. 7. Fig. 9 is a section on the line 9—9 of Fig. 8. Fig. 10 is an enlarged plan view, similar to Fig. 7, showing in detail the parts for forming the cross head and also showing the mortised end of the pincer-carrying shaft 221 in horizontal section. Fig. 11 is a detailed plan view showing the device for bending and roughly forming the cross head. Fig. 12 is a similar view showing the position of the same parts during the formation of the cross head. Fig. 13 is a section on the line 13—13 of Figs. 5 and 10. Fig. 14 is a section on the line 14—14 of Fig. 5. Figs. 15 and 16 are sections on the line 15—15 of Fig. 5; these two drawings showing the cams in different positions. Fig. 17 is a section on the line 17—17 of Fig. 5. Fig. 18 is a detail view of the device for preventing reverse motion of shaft 122. Fig. 19 is a rear elevation of the upper portion of the feeding mechanism showing the wire guide and upper part of the roll supporting frame in section. Fig. 20 is a section on the line 20—20 of Figs. 2a and 19. Fig. 21 is a section on the line 21—21 of Fig. 19. Fig. 22 is an enlarged vertical section through the axes of the feed rolls. Fig. 23 is a front elevation of the mechanism J for producing the twisted eye. Fig. 24 is a section on the line 24—24 of Fig. 23. Fig. 25 is a plan view of the device for making the twisted eye. Fig. 26 is a side elevation of the device for making the twisted eye, certain parts being broken away and shown in vertical section. Fig. 27 is a section on the line 27—27 of Fig. 23. Fig. 28 is a section on the line 28—28 of Fig. 23. Fig. 29 is a plan view showing part of the platform S, and also the equalizing device G thereon. Fig. 30 is a section on the line 30—30 of Fig. 29. Fig. 31 is a section on the line 31—31 of Fig. 29. Fig. 32 is an enlarged vertical section, taken through a wire strand, of the cutting off mechanism D, guide mechanism C, and associated parts. Fig. 33 is a section on the line 33—33 of Fig. 32. Fig. 34 is a vertical section similar to Fig. 33, showing the guide blocks in another position. Fig. 35 is a section on the line 35—35 of Figs. 32 and 36. Fig. 36 is a plan view showing the shaft 102 and the mechanism for working the longitudinally moving rod 323. Fig. 37 is an end view of the mechanism for operating the rock shaft 94, whereby the knives 91 are actuated. Fig. 38 shows the tie manufactured by this machine. Fig. 39 shows separately one of the finger plates associated with the compressing jaws for finishing the cross head. Fig. 40 is a plan view showing the cross head in position between the open compressing jaws. Fig. 41 is also a plan view showing the compressing jaws closed upon the cross head. Fig. 42 is an end view of the compressing jaws seen in the direction of the arrow in Fig. 41. Fig. 43 shows in elevation the relation of the guard disk 123 to the fixed vise arms on disk 133. The short arrows adjacent to the lines indicating sections, show the direction of view.

Similar numbers and letters of reference indicate like parts.

I. *The Object of the Machine.*

The object of the machine is to make the wire bale tie shown in Fig. 38. This tie has at one end a single eye or loop *a*, formed by twisting the wire, and at the other end a peculiarly formed cross head *b*. Said cross head is an eye or loop formed also by twisting the wire, but shaped to produce a hook *c* and a strut *d*. When the tie is placed around the bale the cross head *b* enters the eye *a*, so that the eye is received on the hook *c*, while the strut *d* rests against the twisted portion of the tie adjacent to the eye *a*. The direction of the twist at the cross head *b* is preferably opposite to that at the loop *a*. The machine may be used to make the cross head *b* and the eye *a* on opposite ends of the tie wire; or, by disconnecting the cross head forming mechanism, it may be used to produce only the eye *a* on one end of the tie wire, the other end being left straight. This last form of tie is the well known single loop tie in common use.

II. *The General Construction and Arrangement of the Machine.*

This is best shown in Figs. 1ª and 1ᵇ, which when placed together (1ª on the right of 1ᵇ) exhibit the whole machine in front elevation: in Figs. 2ª and 2ᵇ which when similarly placed together (2ª on the right of 2ᵇ) exhibit the whole machine in plan and in Fig. 3 and Fig. 4. The machine may be broadly divided into the following mechanisms.

1. The means for feeding the wire as it comes from the annealing furnace into the machine proper. This is shown at A and comprises as many pairs of feed rolls as there are parallel wires simultaneously fed. The group of rolls is supported on a frame B, separate from the frame of the machine proper, but said rolls are driven by gearing actuated by a rotary shaft extending from the right hand end of the machine.

2. The guides for the fed in wires, whereby they are held until simultaneously cut to proper length. There are five sets of these guides shown at C, spaced at such distance apart as to support the fed in wires, while guiding them in straight lines and parallel to one another.

3. The means for cutting the fed in wires to proper tie lengths. This comprises as many vibrating knives as there are wires all operating simultaneously to cut the wires after they have been fed into the guides C. This device is located at D.

4. The conveyers for transporting the now cut ties successively in a lateral direction. As soon as the ties are cut to length they drop vertically from the guides C and cutting off device D, upon a number of parallel moving conveyers E, by which they are carried forwardly and downwardly.

5. The rocking guides for diverting the cut ties out of the machine at will. These are shown at F, and consist simply in triangular metal plates mounted on a rock shaft worked by hand. When the guides are swung in one direction the tie wires successively slide down their edges to the cross head and eye forming mechanism. When they are swung in another direction the tie wires drop through the machine framing to the floor.

6. The device for bringing the ends of the cut off ties into the same vertical plane. This is indicated at G. It equalizes the ends as the tie wires are presented to the cross head and eye forming mechanism.

7. The means for carrying the ties while the cross head and eye are being formed. This consists of a series of wheels H, mounted on a rotary shaft and each having on its circumference four shoulders. The ties rest on the shoulders and extend from wheel to wheel, and thus are carried around by the wheels. The ends of the ties protruding beyond the last wheels of the series are acted upon by the cross head and eye forming mechanisms.

8. The cross head forming mechanism. This group of devices is located at I.

9. The eye forming mechanism. This group of devices is located at J.

After the cross head and eye are formed the finished ties escape from the machine.

III. *The Framing.*

The feed rolls, as already stated, are supported on their own standards. All of the remaining parts above noted are supported in frames which rest upon the bed K. Of these frames there are three, namely: The long frame L, which carries the guides C, the cutting-off device D, and the conveyers E, with certain of their operating mechanisms: the short frame M which carries the mechanism for making the eye *a* and which is fixed on frame L; and the short frame N which carries the mechanism for making the cross head, but which is movable on frame L.

The construction of frame N, whereby it is rendered movable is as follows: (See Figs. 1ᵇ and 4). Supported in brackets O on the bed K are two parallel rods P. These rods loosely pass through openings in the supporting plates Q of frame N, so that said frame may slide on said rods. Said supporting plates have threaded openings to receive the horizontal screw R, the shank of which passes through a fixed bearing S on bed K, and has a squared end to receive a wrench.

By turning said screw R the frame N may be moved nearer to, or further from, the frame M, and in this way the machine may be adjusted to produce the cross heads b on tie wires of different lengths. In order to permit this movement of frame N, it is, of course, necessary that shafts 165 and 122 shall be lengthened or shortened. This is done by removing the shaft section U, Figs. 1ª, 1ᵇ, of shaft 122, by disconnecting couplings V, and the shaft section W of shaft 165 by disconnecting couplings X and substituting longer or shorter shaft sections in place of those removed.

Power is transmitted to the machine by a belt on the driving pulley 38, Figs. 1ª, 2ª and 3, which is loose on first motion shaft 39, Figs. 3 and 20. On the shaft 39 and associated with the driving pulley 38 is a clutch mechanism 40, controlled by the lever 41, by which means the driving pulley may be made fast upon the shaft in the usual way. Any clutch mechanism may be employed suitable for the purpose.

The Wire Feeding Mechanism.

This is best shown in Figs. 1ª, 2ª, 19, 20, 21 and 22. Fast on the shaft 39 is a pinion 42, Fig. 3, which engages with the large gear 43 fast on shaft 44, and said gear 43 engages with the pinion 45 fast on shaft 46. Shaft 46 extends from the machine proper to the feeding mechanism represented at A, and supported on standards B. On shaft 46 is a bevel pinion 48, engaging with gear 49, the shaft of which through the train of bevel gears 50, 51, 52, actuates the feed roll shaft 53, fast upon which are the lower feed rolls 54, Fig. 20. The several feed rolls 54 are arranged in separate housings 55, Fig. 22, which housings are placed side by side and are secured by bolts 56 to the platform 57 carried by standards B. In each housing there are two bearings 58 for the lower feed-roll shaft 53, which bearings are free to slide vertically in ways 59 in said housing, and rest upon the bottom of said ways. The upper feed rolls 60 are each provided with an independent shaft 61, received in bearings 62, which also slide in the ways 59. In each housing and resting thereon is a presser shoe 63, having an upwardly projecting pin 64, entering a socket in the housing cap 65, in which socket there is a helical spring 66, forced downwardly by the adjusting screw 67, by which means the pressure of the upper feed rolls 60 upon the lower feed rolls 54 may be adjusted.

Bolted to the end housings of the series is a cross bar 68, which is slotted to receive as many tubular wire guides 69 as there are pairs of feed rolls. The shanks of these guides are threaded and are secured in the slots by nuts 70, Fig. 21.

Extending across the front side of the feed roll housings is a bar 71, in which are as many slots as there are pairs of feed rolls, and in each slot is adjustably secured by means of the bolt 72, a U-shaped piece 73, which receives between its arms a tubular wire guide 74. The openings in the guides 74 are enlarged to receive the tubes 75, which tubes are formed of coiled wire and serve as flexible fairleaders for the wire strands in their passage from the feeding device A to the machine proper. The ends of the fairleaders 75 are secured in the tubular guides 74 by means of the clamping screws 76.

The tubular guides 69 are in line with the guides 74, and are so placed that the wires in traversing them also pass between the feed rolls and thence through the fairleaders 75 to the machine proper. The bar 68 and the bar 71 are provided with slots to enable the tubular guides 69 and 74 to be adjusted transversely, thus effecting a lateral adjustment of the wires with respect to the feed rolls. This assures utilization of the whole working face of said feed rolls; for if the wire were invariably in position, it is obvious, that the working faces of said rolls would become worn over a width only equal to the diameter of the wire, and hence the diameters of the rolls would become reduced at this point. Hence, the amount of wire fed per revolution of the rolls would become reduced so that uniform feeding of the wire would be rendered impossible. By shifting the wire laterally, new parts of the roll face are constantly exposed, and in this way the wear on the entire face of the rolls is rendered uniform.

Attention is now called to the fact that the rear tubular wire guide 74 may be at will lifted out of its U-shaped support 73. The purpose of this is as follows: When the reel of wire which is being fed into the machine has become exhausted, it is, of course, necessary to bring in the end of a new reel. But after the end of the wire has passed the feed rolls, said rolls have no further feeding action on it. Hence there is a length of wire extending from each guide 74 to the cutting-off device D in the machine, which lengths of wire must first be removed before the ends of the new wires can be inserted. This removal is conveniently effected by lifting the guide tubes 74 out of their U-shaped supports 73, and pulling out the wires by hand. The guides 74 are then replaced and the new wires inserted.

Returning now to the train of gears 50, 51 and 52: the gears 50 and 52 are secured on the ends of their respective shafts so as to be removable at will. The gear 51 is carried by a stud 78 from which it is also removable and this stud is supported on a pivoted arm 79. Arm 79 has a cross slot through which passes a fixed stud 81, on the side plate 80, Fig. 19. The arm 79 by means of the handle 82 can be adjusted in any desired position on its pivot, and there secured by a nut on the stud 81.

The object of this arrangement is to enable different gears to be substituted for the gears 50, 51 and 52, so as to change at will the rate of speed of revolution of the lower feed rolls 54, so as to allow more or less wire to be fed per given time.

*Device "D" for Cutting Off the Wires.*

This is shown in detail in Figs. 32 and 35. Bolted to the frame of the machine is a standard 84, on the front side of which is secured a cross bar 85, Fig. 32. In said cross bar are secured as many tubular wire guides 86 as there are wires entering the machine. The mode of securing these tubular wire guides in the cross bar is not shown in the drawings, but any convenient means may be employed. The tubular guides 86 receive the ends of the coiled wire guides 75, and said ends are held by clamping screws 87. The several wires then pass through tubular guides 88 seated in the standard 84, and on the rear side of said standard 84 the wires are acted upon by the cutting off knives 91, Fig. 35, which knives operate at suitable intervals to divide said wires into bale tie lengths. The construction of this cutting off device is substantially the same as described in my aforesaid prior patent; therefore, any detailed explanation is here unnecessary. Briefly, however, it is constructed and operates as follows: In the upper part of standard 84 is a transversely sliding bar 89, Fig. 35, on the lower side of which are secured by the bolts shown, a number of recessed blocks 90. The cutting off knives 91 are pivoted on the rear side of standard 84, and each knife is provided with an upwardly extending arm 92, having a rounded end which enters the recess of its associated block 90. As the bar 89 is moved to and fro transversely on the standard 84 by means of the lever 93 on rock shaft 94, against the action of spring 95, bearing on lever 93, the edges of knives 91 are swept across the rear ends of the guide devices 88, and thus all of the wires are simultaneously divided. The mechanism for operating rock shaft 94 will be described hereafter.

*The Guiding Devices for the Wires During the Feeding-In and Cutting-Off Operation.*

The cutting-off device acts when there has been fed into the machine a suitable length of wire to form the tie. In order to retain this length of wire and to direct it in a right line during the feeding in operation, the guide devices indicated in Figs. 1ª, 1ᵇ, 2ª, 2ᵇ and 4 at C are employed. These are alike in construction and are spaced at intervals along the machine.

Referring to Fig. 33: each guide device C consists of a fixed standard 96 which supports a cross-arm 97 on the under side of which are blocks 98, having on their under side recesses to receive the wires. Sliding in the cross-arm 97 is a bar 99, from which depend rods carrying blocks 100 which support the wires in the recesses of blocks 98, as shown in Fig. 33. When the sliding bar 99 is vibrated by an arm on the rock shaft 94, the blocks 100 are withdrawn from beneath the recesses in blocks 98 and the wires are then free to drop, as indicated by the arrows in Fig. 34. The cutting off of the ties by the knives 91, Fig. 35, and the removal of the blocks 100 from beneath the blocks 98 occur at the same instant. The cut-off ties then fall upon the conveyers E.

*Conveyers "E" for Transporting the Cut-Off Ties to the Twisting and Forming Devices.*

These are best shown in Figs. 3, 4, 32 and 35. Supported in bearings on the lower transverse bar of the standard 96 are two shafts 102 and 103, Figs. 33 and 35. Also supported in brackets on the side of frame L is a shaft 104, Fig. 4. On the shafts 102, 103 and 104 are sprocket wheels 105, 106, 107, and over these sprocket wheels passes the endless conveyer E. The shaft 102 carries a number of sprocket wheels 105, with corresponding sprocket wheels 106, 107, on the associated shafts 103, 104. The conveyers E are all alike and are made up of linked-together sections so that the outer surface of each conveyer presents a series of projections and indentations. So much of the conveyer as passes over sprocket wheels 105, 106 is horizontal; between sprocket wheels 106 and 107 the conveyer is inclined. The several conveyers E are disposed with their horizontal portions below the guide devices C and cutting off device D, so that as the cut off ties drop from these guide devices in the manner already described, they fall in the direction of the vertical arrows (Figs. 4, 34, and 35), directly on these conveyers and into the indentations between the projections thereof, so that said ties all lie parallel to one another, extending from conveyer to conveyer, and by reason of the traveling of the conveyers are carried first laterally and horizontally, and then laterally and downwardly to the devices which subsequently act upon them.

Associated with each of the conveyers E is an idler sprocket wheel 109, which is supported on the short twisted stud 110, fastened on the frame L. The function of this idler wheel is simply to tighten the conveyer. The conveyer E shown in Fig. 35, which receives the extremities of the cut off ties from the cutting off device differs from the other conveyers in that it passes over only the sprocket wheels 105 and 106, and, therefore, has no downwardly inclined portion. The object of this conveyer is simply to keep the ends of the cut off ties out of the mechanism which lies below it. After leaving this conveyer the ends of the ties are unsupported, such support not being necessary at this point. The conveyers E deliver the ties successively to the movable guides F, which may be placed either so as to divert the ties entirely out of the machine, or to the succeeding device for bringing their ends in the same transverse vertical plane.

*The Guides "F" for Diverting the Ties Out of the Machine, or to the Equalizing Device, at Will.*

It is sometimes desirable to make repairs of the cross head or eye forming mechanisms without stopping the feeding in of the wires, especially when the wires come directly from the annealing furnace. The guides F now to be described serve to divert the cut off ties, after being cut to a length, out of the machine whenever desired, or to conduct them to the forming mechanism. Said guides are best shown in Figs. 17, 29 and 30. In the plan view Fig. 29, the ties are supposed to be moving from right to left of the drawing in the direction of the long arrow shown immediately below their ends.

108 is a rock shaft journaled in the frame of the machine carrying a number of the fixed triangular guide plates F. When the shaft is adjusted in the position shown in Fig. 17, and also Fig. 4, so that the guide plates F bear against the shaft 104, then the ties fall from the conveyers E successively upon the uppermost side e of the guides F (see arrows l, Fig. 30) and slide laterally down that side to the device for equalizing the ends. See also Fig. 17. When, however, shaft 108 is rocked so as to bring the sides f of the guides uppermost, then the ties successively and laterally slide down that side and fall down through the framing of the machine to the floor. The rock shaft 108 is rocked by means of handles 112 fast upon it at or near its ends. See Figs. 5, 29, 30, 31.

In order to hold the shaft in position as adjusted by the handles 112, the following device is provided. On the end bearing of the shaft 108 is a disk 111, Fig. 31. On the face of this disk are cut a number of radial grooves 114. On the shaft 108 is a projecting pin 115, which may enter any one of these grooves. The shaft 108, and hence the pin 115 on it, is forced against the face of the disk 111 by means of a helical spring 116, Fig. 5, which bears upon the end shaft bearing 117 and also upon a collar 118 upon the shaft. The depth of the radial grooves 114 is less than the semi-diameter of the shaft, so that the pin 115 will slide into and out of said grooves without requiring that the operator working the handle shall do other than simply rock the shaft. That is to say: he is not obliged to give the shaft any longitudinal motion. When the pin 115 has entered any one of the grooves 114 the shaft will be sufficiently held from accidental rotation. The radial grooves are so placed as to hold the rock shaft and consequently the guides F in the positions already noted: that is, with either the side e or the side f uppermost.

Each guide F has on its lower side a projecting arm 119, Fig. 18, upon which arms the ties after sliding down the sides e of the guides F are received ready to be picked up by the four shouldered projections 120, formed on the circumference of the carrier wheels H, which wheels are all carried on the shaft 122, Figs. 2ª, 23 and 24. Also on the shaft 122 is a sheet iron disk 123, Figs. 4, 17 and 43, the circumference of which is cut away to form four shouldered notches 124. The ties are moved laterally into these notches at the same time as they are moved upon the projections 120 of wheels H. The disk 123 has a peculiar function of its own, which can best be explained hereafter in connection with other parts of the mechanism. For the present it may be regarded simply as one of the rotary supports for the tie, similar to any one of the wheels H. The ties are moved from the arms 119 on the guides F to the shouldered projections of the wheels H and disk 123, by a finger, which also will be hereafter described. As the ties pass successively upon the projections of wheels H and disk 123, their ends are all brought into the same transverse vertical plane by means of the equalizing device now to be described.

*The Equalizing Device "G."*

Referring to the plan view, Fig. 29, it will be observed that the tie g farthest on the left of the drawing rests upon one of the projections 120 of wheel H, and also on arm 119 of guide F; that the next three ties h, i, j, rest on the side e of the guide F and also on the conveyers E. The remaining ties shown are in the conveyers E, which are not represented in Fig. 29, for the sake of clearness.

The equalizing device is constructed as follows: See Figs. 2ª, 25, 29 and 30. 125 is a bar which slides in bearings 126 on the platform S of frame M. On one end of this bar is a flat metal plate 127; and on the upper part of the bar is a roller 128 received between the jaws on the end of a pivoted lever 129. At the end of the lever 129 is a roller 130 entering a groove in a cam 131 on shaft 44, Fig. 32. As the shaft 44 rotates, the cam produces a vibration of the lever 129, which is so timed by the construction of the cam groove as that as soon as each tie comes on the projections 120 of wheels H, the bar 125 carries this plate 127 from the position shown in dotted lines Fig. 29, to the position shown in full lines, thus pushing on the end of the tie and moving it longitudinally for a definite distance. As each tie in turn is moved in this way, as soon as it comes upon the projections 120 of wheel H, it follows necessarily that all of the ends of the several ties are brought into one and the same transverse vertical plane. This is what is meant by equalizing the ends of the wires.

During the equalizing just described the shaft 122 carrying wheels H and disk 123 remains at rest and it does not begin to rotate to carry the tie in the direction of the arrow $k$, Fig. 30, until the first operation incident to forming the cross head on the end of the tie is completed. This should be clearly borne in mind in reading the following description.

*The Cross-Head Forming Mechanism.*

In making the cross head $b$, Fig. 38, three operations are performed, these taking place successively upon the tie at three different points in its path of rotary motion, while carried by the wheels H. These three cross head making operations are as follows: First, the end of the wire is bent over to form a bight, which bight is at the same time roughly brought to cross head shape. Second, the folded back end is twisted with the standing part. Third, the roughly formed loop is compressed to bring it to the final cross head shape. The formation of the twisted eye $a$ at the other end of the wire occurs simultaneously with the second of these operations. I will first describe, therefore, the mechanism for forming the cross head $b$, and afterwards the mechanism for forming the twisted eye $a$.

Referring to Fig. 5; and particularly to the tie $g$ shown as lying in the wheel H and metal disk 123. Following that tie to the right of the figure it will be seen that it extends across certain mechanisms before it terminates. These mechanisms are devoted to the formation of the cross head $b$, and will now be explained, reference being had to Figs. 5, 13, 15 and 16.

(1.) *The revolving vise.*—Fast on the shaft 122, Fig. 15, is a disk 133, which carries four vises T, U, V, W. The fixed jaws 134, 135, 136 and 137 of the several vises project radially from and are integral with the disk 133. Associated with these fixed jaws are movable jaws 138, 139, 140 and 141. As the construction of each of these vises is the same, the description of one applies to all. The movable jaw 138 of vise T is pivoted at 142 on the disk 133, and has an arm 143, carrying a stud and roller 144, which roller enters the groove of a cam 145, which is loose on shaft 122. The back plate 146 of this cam is broken away in Figs. 15 and 16. The cam 145 being loose on the shaft 122 would naturally turn with that shaft if not prevented. Assume for the moment, that the cam 145 is held from rotating with the shaft 122 while the disk 133 rotates with the shaft 122 in the direction of the arrow, Fig. 18. The working face of the cam 145 will then be the face $m$, and this face acting on the rollers 144 will close the jaws of the three vises T, U, V. But when the roller 144 of any vise runs upon the working face $n$ of the cam, then that face will operate to open the vise W in Fig. 15. Therefore, in Fig. 15, the three vises T, U, V, are all closed while the vise W is open. The vise T is the one into which the ties are moved laterally and successively from the arms 119 of guides F at the same time as they are moved upon the shouldered projections 120 of wheels H. This lateral movement of each tie is effected by a finger, to be described further on. As soon as a tie is moved between the jaws of vise T, it is important that said jaws should come together quickly. It is also important that this particular vise T, or rather the particular vise of the four coming into the position of vise T, should be the only one making this quick closing. Hence, the quick closing mechanism must be so constructed as to affect only that particular vise at that particular moment, and not the other vises U, V, W. This mechanism I will now describe.

Fast on the shaft 148, Figs. 5, 6, 15, 16, is a cam 149, in the groove of which runs a roller 150, which is on the side of a lever 151, pivoted at its base to the frame of the machine. Lever 151 is forked to receive a roller 152 on the arm 153, one end of which is pivoted at 154 on the back plate 146 of cam 145. The other end of the lever arm 153 is bent upward as shown in dotted lines, Fig. 16, and is provided with a slot which receives a fixed screw 155, which screw is on the back plate 146 of the cam 145. The engagement of lever 151 with the roller of arm 153 prevents the cam 145 from rotating on shaft 122.

The working face of cam 149 is at $o$, and by comparing Figs. 15 and 16 the operation of this working face will be readily followed. When the cam 149 is in the position shown in Fig. 16, the working face $o$ is just about to act on the roller 150. The jaws of vise T are then open; but when the working face $o$ runs on the roller 150 as shown in Fig. 15, then the cam 145 is rotated on shaft 122, but in a direction opposite to that of the rotation of said shaft. The projection $t$ on the rotating surface $m$ of cam 143 is thus moved under the roller 144, which controls the upper vise jaw 138 of vise T. This condition is shown in Fig. 15. The effect is to throw the roller 144 toward the left of the drawing, thus causing cam 143 to bring jaw 138 of vise T quickly toward jaw 134.

(2.) *The finger for moving the tie into the vise.*—In Fig. 5, just to the right of the vise T will be seen an upwardly projecting finger 156, the function of which is to carry the wire $g$ between the jaws of said vise. Said finger and its operating mechanism are shown in detail in Figs. 10, 11, 12 and 13. Before the first forming operation begins on the cross head the tie is carried by the finger 156 between the vise jaws and is also clamped laterally between said finger 156 and a fixed stop 157, Figs. 11 and 12. It is not at that time grasped tightly between the jaws of vise T, because the movable jaw of said vise has not yet descended to a sufficient amount.

The mechanism for working the finger is best shown in Fig. 13, in which the fixed stop 157 is shown broken away, but its continuation to the end, where the finger 156 meets it, is indicated by dotted lines. The finger 156 is formed upon the upper side of a vibrating bar 158 in one end of which is a slot through which passes a pin 160 on lever 161, pivoted at 162 to the platform of frame N. By loosening the clamping pin 160 the bar 158 may be longitudinally adjusted. On the lever 161 is a roller stud 163, which enters a cam groove in the face of the rotary cam 164, which is fast on shaft 165. The bar 158 rests in the groove of a roller 159, which is carried on the bell crank 166, on shaft 167, Fig. 10, which is supported in hanger bearings 168. At the other end of shaft 167 is another bell crank 169, which is connected to a downwardly extending link 170, Fig. 13. Link 170 is connected to one end of a pivoted lever 171, (dotted lines Fig. 13), the other end of which lever carries a roller pin upon which bears the cam 172 fast on shaft 148. By the rotation of shaft 148 the linkage 170, 171, is operated to rock the shaft 167 and so to raise and lower the roller 159 and consequently the finger carrying bar 158. The timing of this mechanism is such as that the cam 172 through the intervening mechanism first raises the finger 156 in a substantially vertical direction, and then the cam 164 through the intervening mechanism moves that finger to the left of the drawing, Fig. 13, thus clamping the tie between the face of that finger and the stop bar 157, while at the same time bringing the tie between the jaws of the vise T.

(1.) *Forming the cross-head.*—(*First operation*).—The tie wire is now in position for the first forming operation of the cross-head to begin. The first forming device is best shown in Figs. 10, 11, 12 and 13. It includes a segmental plate 174, upon which are three upwardly projecting pins 175, 176, 177, Fig. 11, one of which, 175, is disposed in the axis of rotation of said plate, and the others 177 and 176 are disposed eccentrically to said axis. There is also a horizontal bell crank 178, fast on the upper end of shaft 179, and carrying a roller stud 180. Just below the bell crank on shaft 179 is a loose stripper plate 181, Fig. 13, having a flange 182. The function of this plate will be described further on. The function of the bell crank arm 178 which extends over the platform 121 of frame N is to carry the end of the tie around the pins 176 and 177 in the manner also hereinafter described. The segmental pin carrying plate 174 is supported on a vertical shaft 183, Fig. 13. This shaft besides having a rotary motion also has a vertical sliding motion in the long fixed sleeve 184, and in its step 185. The vertical sliding motion is imparted to the shaft 183 in the following manner: The lower portion of the shaft is threaded to receive a two flanged collar 186, which may be adjusted vertically on said threaded portion and held in position as adjusted by the lock nut 187. Between the flanges of the collar 186 enters a pin on the end of the pivoted bell crank lever 188, Fig. 5. The other arm of said lever is provided with a roller stud which enters the groove of cam 189 on shaft 148. Hence, as shaft 148 rotates, shaft 183, through the mechanism described, is given a vertical motion, by means of which the segmental plate 174, which is normally in its lowest position, as shown in Fig. 5, is carried up into working position, as shown in Fig. 13, and in plan in Figs. 10, 11, 12.

The shaft 183, and hence the plate 174, is rotated by the following mechanism. Fast on the shaft 184 is a pinion 190, Fig. 13, which engages with a sliding rack bar 191, Figs. 6 and 13, the back of which rack bar bears against a flanged roller 192, supported on standard 193, Fig. 13. Linked to one end of the rack bar 191 is an arm 194, Fig. 6, which is pivoted to the top of a fixed standard 195 and carries roller stud 196, which enters the groove of cam 197 on shaft 148. Hence, by the rotation of shaft 148, through the above described mechanism, a partial rotation to and fro is communicated to the pin carrying plate 174.

The shaft 179 which carries the bending arm 178 is operated in the following manner. Said shaft passes through a long fixed sleeve 198, Fig. 13, and at its lower end carries a toothed pinion 199. With this pinion engages the curved rack 200, on the end of arm 201, which arm is integral with the long sleeve 202, supported on the vertical standard 203. Said sleeve carries another arm 204, on which is a roller stud which engages with the groove in cam 205, which is on shaft 148. The rotation of shaft 148, therefore, through cam 205, arm 204, sleeve 202, rack arm 201 and pinion 200, rotates shaft 179 and hence bending arm 178.

Returning now to Figs. 10, 11 and 12: The first operation of bending over the end of the tie and roughly forming the cross head will easily be followed. The tie g, as already described, being held between the finger 156 and the fixed stop bar 157, the segmental pin carrying plate 174 rises into the position shown in Fig. 13, and also in plan in Fig. 11. The tie is now received between the central pin 175 and the eccentric pin 176 and lies in the groove of the roller 180 carried by the arm 178. The arm 178 begins its rotation to the left and the pin carrying plate 174 begins its rotation to the right at the same moment. The direction of these rotations is indicated by the arrows of Figs. 11 and 12. The first effect of the rotation of plate 174 is to carry the pin 176 around pin 175, making the hook c in the cross head, as shown in Fig. 12. As soon as this hook is formed to the extent shown in Fig. 12, the arm 178 begins to bend the tie around pin 177. At this point the finger 156 is retracted and lowered so as to get out of the way of the end of the tie which is moving to the left. The segmental pin carrying plate 174 has now reached the end of its rotary movement, but the arm 178 continues its motion, now bringing the bent over end of the tie between the jaws of the vise T as shown in Fig. 10. At this moment occurs the sudden grip of the vise already described in connection with Figs. 15 and 16. The cross head loop must now be got clear of the pins 175, 176, 177. The arm 178 now reversing its motion moves in the direction of the curved arrow, Fig. 10, and the shaft 183 descends. As the tie rests, however, upon the flange 182, of the disk 181, that flange prevents the tie from descending with the plate 174, thus acting as a stripping device. As soon as the shaft 183 has descended, it is rotated in the reverse direction so as to bring the pin carrying plate 174 back to its original position as shown in Fig. 11. The first operation, therefore, of forming the cross-head is now completed.

(2.) *Forming the cross-head—(Second operation)*.—The shaft 122 is rotated one quarter of a revolution, carrying with it the wheels H and the tie g thereon, now clamped in the vise T. This partial revolution of the shaft 122 is effected in the following manner. Fast on shaft 148 is a pinion 342, having on its face a cam 206, Figs. 5, 6 and 17. Entering the groove of this cam is a roller stud 207, on the lever 208 pivoted at 209. The upper end of said lever carries two segmental racks 210, which engage with two similar racks 211 formed on the plates 212, which are loose on the hub of a four toothed ratchet wheel 213, Fig. 17, which ratchet wheel is fast on shaft 122. Between plates 211 is a short shaft 214 adjustable in slot 215, loose on which shaft 214 is the dog 216, which engages with the teeth of ratchet 213. The rotation of cam 206, therefore, causes a to and fro vibration of the lever 208, and hence, through segmental gearing, of the plates 212, so that by the engagement of dog 216 with the ratchet 213, the shaft 122 is carried forward a quarter of a revolution at each rotation of shaft 148.

In order to prevent reverse motion of shaft 122, there is provided a ratchet 217, Fig. 18, fast on said shaft, and a pawl 218 pivoted on the frame of the machine engaging with said ratchet.

The device for performing the second operation in producing the cross-head is best shown in Figs. 5, 7, 8, 10, 13. Its function is to twist together the parts of the tie immediately adjacent to the now partly shaped cross head. The location of the tie is indicated at $g^2$, Fig. 10. This is effected in the following manner: Shaft 122 being turned forward a quarter of a revolution, the cross-head held by vise T comes into position to be grasped by the pincers 219, which are initially retracted towards the right of Fig. 10, for a sufficient distance to enable the cross-head to be brought into place. The pincers 219 consist of two arms pivoted at 220 in a mortise formed in the end of shaft 221. Through the outer ends of the arms 219 pass two pins carrying steel disks 222, which grasp the cross-head on opposite sides. The pins are threaded where they pass through the arms of the pincers and are provided with jam-nuts, so that they may be adjusted as desired nearer together or further apart to regulate the grasping pressure of the arms. The pincer arms 219, at their opposite ends in the shaft mortise are provided with inwardly projecting pins which receive a helical spring 223, which normally tends to force said ends outward and hence to separate the grasping disks 222. The shaft 221 slides in bearings in standards 224 on platform 121 of frame N, in order to move the pincers to and from the cross head. It also has a rotary motion in order to effect the twisting.

The sliding movement of the shaft 221 is caused by the following means, see Fig. 5, on the right. After passing through the end bearing said shaft is threaded and receives a collar 225. This collar bears against a cushion spring 226 received on the shaft. On one side of the collar are adjusting nuts 227 and similar adjusting nuts 228 are provided on the outer side of the cushion spring 226. By adjusting these nuts 227 and 228, shaft 224 may be adjusted longitudinally. The collar 225 is supported in a yoke on the end of the vertical lever 229, pivoted at its lower end in a bracket 230, and carrying a roller stud 231, which engages in a groove on a cam 232, which is fast on shaft 165. Therefore, as shaft 165 rotates the lever 229 is vibrated on its pivot 230 and a to and fro motion is imparted to the pincers for the purposes already described.

The shaft 221 carrying the pincers is rotated by the following device. On the shaft 165 is a mutilated gear 233, Fig. 14, which engages with a gear 234 on a short shaft 235. Shaft 235 carries at its end a crank disk 236, Figs. 5, 6 and 14, and in the radial slot of crank disk 236 is a stud which passes through the end of the rod 237. Pivoted at 238 to the upper end of rod 237 and received in inclined ways 239 is a straight rack 240, Figs.

4 and 5. The rack 240 engages with the pinion 241, which is on the short shaft 173, Fig. 10, and this shaft carries a pinion 147 which engages with a pinion 132 on shaft 221.

In order to effect the closing together of the pincer arms 219 the following device is provided, see Fig. 10. Inclosing the mortised portion of shaft 221 is a sliding collar 242, carried on the end of an arm 243, Fig. 5. At the lower end of arm 243 a long sleeve is provided, which is pivoted between the hangers 244, Fig. 13. Also connected to said sleeve is a downwardly depending arm 245, carrying a roller stud 246, which enters an edge groove in cam 247, which cam is on shaft 165, see Figs. 8 and 13. By the rotation of cam 247 the arm 243 is vibrated to cause the roller 242 to slide lengthwise on shaft 221 and so to bear upon the ends of the arms of pincer 220 to close them together when said collar moves to the right of Fig. 10, or to allow them to open by the action of spring 223, when said collar moves to the left of Fig. 10.

The operation of the whole device can now be followed. The partly formed cross head being brought into position as described, shaft 221 is moved to the left of Fig. 10 to bring the clamping disks 222 respectively on each side of the cross head. Collar 242 is now moved to the right forcing the arms of the pincers, as already described, tightly together, causing said disks 222 firmly to grasp said cross head. The shaft 221 is then rotated, by the mechanism already described, on its own axis and consequently the pincers are rotated to cause the parts of the tie which are between the holding vise and the pincer clamping disks to become twisted together as shown in Fig. 10. Shaft 221 then comes to rest. Collar 242 is moved to the left of Fig. 10 to allow the spring 223 to open the pincer jaws and then shaft 221 is retracted, thus releasing the now twisted cross-head.

(*3.*) *Forming the cross-head*—(*Third operation*).—The partly formed and twisted cross-head is by this operation compressed to its final shape. By the means already described the vise carrying shaft 122 is again turned forward one quarter of a revolution bringing the cross-head into the position shown at $g^3$ of Figs. 7, 8 and 10, where it is subjected to the action of compressing jaws which are constructed in the following manner.

Referring to Figs. 10, 39, 40, 41, 42: 248 and 249 are bent rods pivoted at 250 to the platform 121 of frame N. They carry the forming jaws which are thin plates of steel 251, 252, of about the thickness of the wire itself, having their edges (which meet upon the cross-head when the jaws are brought together) of a conformation suitable to give to the cross-head the final desired shape. This is clearly shown in Fig. 41, where the meeting edges referred to are shown in direct contact with the cross-head wires. Each steel forming plate is disposed between two other plates, Fig. 42; that is to say, the steel forming plate 252 is between the upper plate 253 and the lower plate 254, and all of said plates are secured by bolts 255 to arm 249. Similarly the steel forming plate 251 is clamped between two plates 256 and 257, on arm 248, by means of bolts 258. Upper clamping plates 253 and 256 are provided with inwardly projecting fingers, the fingers of one plate entering the spaces between the fingers of the other. The ends of these fingers, as shown at 259, dotted lines, and 260, Fig. 42, are rounded on their under sides. Lower clamping plates 251 and 254 are provided with similar fingers, the fingers of one plate entering the spaces between the fingers of the other, and these fingers, as shown at 261 and 262, have their ends rounded on the upper side. The fingers of the clamping plates extend inwardly beyond their associated steel forming plates, so that when the jaws come together the fingers on plates 253 and 256 pass above the cross head and the fingers on plates 254 and 257 pass below the cross-head, thus confining the cross-head in place and guiding it by the rounded advancing edges of said fingers in proper position to be met and compressed laterally by the edges of the forming plates 251 and 252.

The device for operating the compressing jaws is as follows: See Figs. 7, 8, 9 and 10: Disposed above the arms 248 and 249 is a horizontal cam 263, fast upon the vertical shaft 264, Fig. 8, stepped at its lower end in the collar 265. On said shaft is a pinion 266, which engages with a rack-bar 267, which slides in ways 268, carried by the platform of frame N. On the end of the rack bar is a pin 269, which enters the forked upper end of a lever 270, pivoted at its lower end at 271. On said arm is a roller stud 272, which engages with a cam 273 on the shaft 165. The cam 263 has two volute grooves on its under side and receives in them roller studs on the arms 248 and 249. The rotation of the shaft, therefore, through the cam 272 and intermediate mechanism, produces partial rotation of the cam 263 in alternately opposite directions, and a consequent closing in and separation of the arms 248 and 249. When the arms are closed together the steel forming plates 251 and 252 strongly compress the partly formed cross-head (see Figs. 40, 41), and when said arms are separated they release the now completely formed cross-head, thus terminating the last of the three operations necessary for its manufacture.

*The device for forming the twisted eye "a" at the end of the tie.*—As has already been stated, the twisting of this eye occurs coincidently with the twisting of the cross-head on the opposite end of the tie; or, in other words, while the cross-head is undergoing its second operation. The position of the tie is represented at $g^2$, in Figs. 23 to 26 inclusive. The tie is shown resting on one of the wheels H, which is, during the following operation, motionless. From wheel H the end of the tie extends under the upper jaw 274 of the gripping vise. The lower jaw of said vise is supported on a threaded rod 276, Fig. 26, which enters a heavy base block 277, bolted on the frame of the machine. It is provided with a jam-nut 278. The base block 277 is forked, Fig. 25, and between the arms of the fork are received the pivot 279 of the vise jaw 274. The same sleeve which carries jaw 274 carries a depending lever 280 on the lower end of which is a roller stud 281, which enters a groove in a cam 282, fast on shaft 165. By the rotation of shaft 165 the lever 280 is vibrated, and in this way the upper jaw 274 of the vise is raised and lowered with respect to its lower jaw 276.

283 is a looping pin supported on a vertical shaft 284, which, as best shown in Fig. 24, extends down through the block 277, and has on its lower end a bevel pinion 285, which engages with a toothed segment 286, supported on a pivoted sleeve 287, which sleeve has a depending arm 288, provided with a roller stud 289, which enters cam 290, also on shaft 165. The twisting head 291 which is carried on the end of shaft 292 is mortised to receive the twisting finger 293, pivoted at 294 therein, and provided with a setting out helical spring 295. On the end of the finger is a pin 296, which passes through an opening in the lower wall of the twisting head. On the lower side of the finger 293 is a projection 297, which extends radially beyond the head, Figs. 23 and 26. This projection 297 when in its lowermost position, as shown in Fig. 23, is met by an adjustable set-screw in the horizontal arm of a rod 298, which extends downward through a bearing 299, and is pivoted to the lever 300, Fig. 28. Said lever is pivoted at one end in a bracket 301 and carries at its other end a roller stud 302, which bears upon a cam 303, on shaft 165. The rotation of shaft 165, therefore, when the stud 297 is in position to be met by the screw on rod 298 operates intermittently to raise the finger 293 from the position shown in full lines to the position shown in dotted lines in Fig. 23.

In order to rotate the twisting shaft 292 I provide mechanism substantially similar to that already described as used for rotating the twisting shaft 221. That is to say, on shaft 292 there is a pinion 304, Fig. 23, which engages with a pinion 305, on short shaft 306. On shaft 306 there is another pinion 307, with which engages a rack 308, which slides in fixed ways 309. The rack 308 is pivoted to the upper end of a rod 310, which at its lower end is loose on a stud 311, which stud enters the radial groove of a crank disk 312, fast on shaft 313. Shaft 313 carries a mutilated pinion 314, which is driven by a mutilated pinion 315 on shaft 165.

The twisting operation is as follows: Referring first to Figs. 25 and 26. The vise jaw 274 is brought into proximity to the end of the tie, but does not make a tight grasp thereof. Shaft 284 is then rotated to carry the bending pin 283 around so that the extremity of the tie is carried over the semi-circle shown by the arrow, Fig. 25, and is looped around the twisting pin 296, which is now in the position shown in full lines in Fig. 23. The vise jaw 274 now descends further tightly to grip both parts of the wire. The shaft 292 carrying the twisting head now rotates, and the pin 296, therefore, produces the necessary twisting at the eye. As soon as this twisting is completed the vise jaw 274 is raised and the rod 298 is lifted, the set-screw on its upper end then striking the projection 297 on the finger 293, thus raising said finger into the position shown in dotted lines, Fig. 23, and withdrawing the pin 296 from the now finished loop. All the parts concerned in the production of the twisted loop just described then return to their original position. During the next quarter revolution of the shaft 122 the completed ties are dropped upon fixed inclined bars 316, down which they slide, as indicated by the arrow in Fig. 24, to the horns 351, Fig. 3, which are supported on shaft 352. On these horns the completed ties are collected until sufficient are gathered to form a bundle. As fast as the bundle of ties are bound by hand, they are removed from the machine.

Mechanism for Working the Cutting Knives.

This is best shown in Figs. 3, 32, 35, 36 and 37. On the shaft 102 is a pinion 317, which engages with pinion 318, Fig. 36, which pinion is on the end of a short shaft 319 journaled in a bearing in a standard 320. On the shaft 319 is a cam 321, in the groove of which enters the roller stud 322, on the end of a rod 323. At its end the rod 323 is reduced in diameter and bent forward as shown at 324, Fig. 37, and said bent up end 324 passes through a swivel eye 325, on the lever 326, which lever is pivoted at 327 to the under side of a casting 328, which is fast on the shaft 94. The lever 326 may, therefore, have a lateral motion on its pivot 327, and imparts an up and down motion to rock shaft 94. The end of lever 326 is bent downward as shown at 329, and may be brought into position to be engaged by a roller stud 320 on one spoke of the gear wheel 43, which gear is fast on shaft 44. On shaft 44, see Fig. 33, is a cam 321, which bears against a roller stud 332 on the side of a lever 333, which at its lower end is pivoted at 334, Fig. 3, to the frame of the machine, and the lever 333 is connected to a retracting helical spring 335, Fig. 33, and said lever carries at its end a spring pawl 336, which engages with the ratchet 337 on shaft 102.

The operation of the entire device, therefore, is as follows: When shaft 44 rotates, the cam 331 causes the pawl 336 on lever 333 to turn shaft 102 forward one-sixth of a revolution, there being six teeth in the ratchet 337. The rotation of shaft 102, through the gears 317 and 318, Fig. 36, rotates the cam 321 and so gives longitudinal motion to the rod 323, thus causing the lever 326, Fig. 37, to swing outwardly on its pivot 327, and thus to bring its bent down end 329 into the path of rotation of the stud 330 on gear 43. As a consequence the stud 320 raises the lever 326 and so rocks the shaft 94, which through the lever 93, as already explained, causes movement of the sliding bar 89, Fig. 35, and causes the jaws of knives 91 simultaneously to divide the wires. The same rocking movement of shaft 94 actuates the lower blocks 100 of guides C through bar 99.

*Device for Operating the Conveyers "E."*

On the shaft 102 are, as already described, the sprockets 105, which carry the chain conveyers 108. Hence as the shaft 102 is rotated by the lever 333 and pawl 336, the sprockets 105 are rotated, and hence the conveyers 108 are made to travel in the manner already described to convey the cut off ties laterally to the guides F.

*Device for Preventing the Cut Off Ties from being Struck by the Vise Arms During the Rotation of the Vise Carrying Disk 133.*

It has already been pointed out that when cut off ties slide down the upper sides $e$ of the guides F, Fig. 18, they are moved laterally by the finger 156 between the jaws of the vise T ready for clamping. As the fixed arms of the several vises T, U, V, W, extend laterally beyond the point to which the finger 156 carries the end of the tie to get it in clamping position, said end would be struck by the ends of the vise arms as said arms are carried around, and hence be displaced. In order to prevent this, I provide on shaft 122, the sheet-iron disk 123, portions $q$ of the circumference of which extend beyond the outermost edges $r$ of the vise arms, Fig. 43. The edge of the disk is notched to form four shoulders 124, and these shoulders register with the shoulders on the projections 120 of wheels H. The consequence is that the ties descending on side $e$ of guides F meet the portions $q$ of the circumference of disk 123 and are held by said portions so as not to be struck by the outer edges $r$ of the vise arms on disk 133, but when the several vises T, U, V, W, successively come into position to receive the ties, then the notches in disk 123 come in front of the guides F and permit the ends of the ties to slide down the guides F to the arms 119 on said guides whence they are moved between the vise jaws by the finger 156, as already described.

*The Device for Throwing the Cross-Head Forming Mechanism Out of Operation.*

The present machine can be used to make bale ties having the eye $a$ only at one end. For this purpose it is necessary to throw the mechanism for making the cross-head entirely out of operation. This is effected in the following manner. Referring to Figs. 7 and 8:—Shaft 165 is divided at 347, and on the portion of that shaft between the point of division and the cross-head forming mechanism is arranged a sliding clutch 348, operated by the lever and handle 349. This clutch engages with the hub of gear 347. It will be obvious that by disengaging the clutch 348 no motion through shaft 165 will be communicated to the cross head forming mechanism.

*The Gearing for Operating the Shafts 165, 122 and 148 from the Driving Pulley 38.*

As has already been explained, the feed rolls are operated from the driving pulley 38, which is fast on shaft 39, through the gears 42, 43 and 45, Fig. 3, which gear 45 is fast or shaft 46. Shaft 165 is operated from first motion shaft 39, by the train of gears 340, 341, 342, 343, Fig. 3, the gear 343 being loose on shaft 165. On the end of shaft 165, as shown in Figs. 2ᵃ and 3, is a sliding clutch 344, operated by handle 345, by means of which clutch the gear 343 can be put into connection with shaft 165 at will. By uncoupling clutch 344, all of the mechanism for making both the cross-head $b$ and the eye $a$ on the tie can be thrown out of operation in order to make the necessary repairs.

The shaft 122 which carries the wheels H is rotated in the following manner. On shaft 165 is a gear 341, Fig. 17, which engages with gear 342, which is loose on shaft 148. As already explained, the cam 206 fast on the face of the gear 342 vibrates the segmental rack 210, Fig. 17, and this rack in turn through the segmental rack 211 and pawl 216 operates the ratchet 213, which is fast on shaft 122.

The shaft 148 is driven by a gear 345, Fig. 6, on shaft 165, which gear engages with a gear 346 on shaft 148.

*The Operation and Timing of the Machine.*

This is as follows: The wire strands are preferably fed to the feeding device A, directly from the annealing furnace, and by the action of the feeding rolls are moved continuously into the machine until a sufficient length of each strand has passed the cutting-off device D. The cutting-off knives then divide all the wires simultaneously. The cut-off ties then fall by gravity into the endless conveyers E, this being permitted by the opening of the guides C, which have received the several strands. The conveyers now carry cut off ties laterally and downwardly and discharge them upon the adjustable inclined guides F, down which they slide one after the other to the shoulders on the carrier wheels H. The ends are equalized by the equalizing device G. The extremities upon which the cross-heads are to be formed are moved successively into the rotating vises T, U, V, W.

As soon as the wire is seated in the first vise the first operation of forming the cross-head on one end takes place. The end of the tie is bent over to form a loop roughly in the shape of the desired cross head, and said bent over end is brought between the jaws of the first vise alongside the standing part of the wire. The vise then acts to clamp both parts tightly. The shaft which carries the vise disk and also the carrier wheels, then moves forward one quarter of a revolution and this brings the partly formed cross-head on one end of the tie and the straight opposite end of the tie to the twisting devices which act simultaneously to twist the cross-head at one end and to produce the twisted eye at the other end. The shaft 122 then makes another quarter revolution and presents the now twisted cross-head to the compressing jaws which give to said cross-head its final form. The shaft 122 now completes its entire revolution and the now finished tie falls to the bundling horns, or out of the machine, as may be desired.

It will, of course, be understood, that all of the various mechanism are to be timed to produce the aforesaid results.

I claim:

1. In a machine for making wire bale ties, means for producing a completely closed eye at one end of the tie wire and means for forming said eye into predetermined shape: the said means operating successively in the order named.

2. In a machine for making wire bale ties, means for producing a completely closed eye at one end of the tie wire and means for subjecting said closed eye to lateral compression to change its shape: the said means operating successively in the order named.

3. In a machine for making wire bale ties, means for bending over the end of a tie wire, means for twisting together the bent over end and standing part to form a completely closed eye, and means for subjecting said closed eye to lateral compression to change its shape: the said means operating successively in the order named.

4. In a machine for making wire bale-ties, means for producing a completely closed eye at one end of the tie wire, means for holding said eye in position, and means for laterally compressing said eye into predetermined shape.

5. In a machine for making wire bale ties, means for producing a completely closed eye at one end of the tie wire, means for holding said eye in position, means for laterally compressing said eye into predetermined shape, and jaws moving in the plane of said eye and constructed to compress said eye into predetermined shape.

6. In a machine for making wire bale ties, a rotary shaft, a vise on said shaft having its arms radially disposed thereto and means for intermittently opening and closing said arms.

7. In a machine for making wire bale ties, a rotary shaft, a vise on said shaft having its arms radially disposed thereto and means on said shaft for intermittently opening and closing said arms.

8. In a machine for making wire bale ties, mechanism for producing an eye at one end of the tie, mechanism for forming said eye into a predetermined shape, and means for transporting said tie from said eye producing mechanism to said eye shaping mechanism.

9. In a machine for making wire bale ties, mechanism for making a bight at one end of the tie, mechanism for twisting said bight to form an eye, mechanism for forming said eye into a predetermined shape and means for transporting said tie successively to said mechanisms in the order named.

10. In a machine for making wire bale ties, mechanism for making a bight at one end of the tie, mechanism for twisting said bight to form an eye, mechanism for forming said eye into a predetermined shape and a revolving vise for transporting said tie to said mechanisms in the order named.

11. In a machine for making wire bale ties, a rotary member, a vise disposed thereon, means for opening and closing said vise, means for feeding ties successively to said vise and means for forming an engaging part on the end of each tie while held in said vise.

12. In a machine for making wire bale ties, a rotary member, a fixed vise arm on the circumference of said member, an independently supported movable vise arm and means for actuating said movable arm to open and close said vise.

13. In a machine for making wire bale ties, a rotary member, a plurality of vises disposed therein, means for opening and closing said vises, means for feeding said ties successively to the vises successively brought into position by the rotation of said member to receive them and means for forming an engaging part on the end of each tie while held in one of said vises.

14. In a machine for making wire bale ties, a rotary shaft, a disk thereon, a fixed vise arm on the periphery of said disk, an independently supported movable vise arm cooperating with said fixed arm, a cam for actuating said movable arm to open and close said vise, means for feeding ties successively to said vise and means for forming an engaging part on the end of said tie while held in said vise.

15. In a machine for making wire bale ties, a rotary shaft, a member fast thereon, a fixed vise arm on the periphery of said member, a cam loose on said shaft having a face groove, a movable vise arm pivoted to said cam, a stud on said movable arm entering said cam groove, and means for preventing rotation of said cam on said shaft: the said cam groove being constructed intermittently to move said movable vise arm toward and from said fixed arm.

16. In a machine for making wire bale ties, a rotary shaft, a member fast thereon, a fixed vise arm on the periphery of said member, a cam loose on said shaft having a face groove, a movable vise arm pivoted to said cam, a stud on said movable arm entering said cam groove, and means for preventing rotation of said cam on said shaft and for intermittently imparting to said cam a partial rotation in opposite direction to the rotation of said shaft, the said cam groove being constructed and the said parts being timed and operating to cause said movable arm first to move toward said fixed arm for a certain distance and then for a certain further distance.

17. In a machine for making wire bale ties, a series of mechanisms for forming an engaging part on the end of a tie, a vise for presenting said tie to said mechanisms successively and means for causing said vise to grip said tie before the operation of the first, and to release said tie after the operation of the last mechanism of said series.

18. In a machine for making wire bale ties, a series of mechanisms for forming an engaging part on the end of said tie, a revolving vise for presenting said tie to said mechanisms successively and means for causing said vise to grip said tie before the operation of the first, and to release said tie after the operation of the last mechanism of said series.

19. In a machine for making wire bale ties, a series of successively operating mechanisms for forming a cross head at one end of the tie and means for moving said tie laterally over an arc shaped path to said several cross head mechanisms in succession.

20. In a machine for making wire bale ties, a revolving vise for holding the tie during the formation of its engaging end, means for bringing the grasping parts of said vise into contact with the tie wire disposed between them and means for subsequently causing said grasping parts tightly to grip said wire.

21. In a machine for making wire bale ties, a vise, means for actuating said vise to bring the grasping parts into contact with a wire disposed between them, means for bending over an end of said wire to form a bight, and for carrying said bent over end between said grasping parts, means for further closing said vise to cause it tightly to grasp both parts of said wire, means for moving said vise to a new position and means for then rotating said bight to form a loop.

22. In a machine for making wire bale ties, a mechanism for forming an engaging part at one end of the tie, a mechanism for forming an engaging part at the other end of the tie, and means for adjusting one of said mechanisms nearer to or further from the other.

23. In a machine for making wire bale ties, a mechanism for forming an engaging part at one end of the tie, a mechanism for forming an engaging part at the other end of the tie, means for moving said tie laterally to said mechanisms, and means for varying the distance between said mechanisms.

24. In a machine for making wire bale ties, a mechanism for forming a cross head at one end of the tie, a mechanism forming an eye at the other end of said tie, means for moving said tie laterally to said mechanisms and means for varying the distance between said mechanisms.

25. In a machine for making wire bale ties, a mechanism for forming a cross head at one end of the tie, a mechanism for forming an eye at the other end of said tie, means for moving said tie laterally to said mechanisms and means for moving said cross head mechanism nearer to or further from said eye mechanism.

26. In a machine for making wire bale ties, a rotary shaft, a plurality of shouldered wheels and a vise on said shaft, and means for laterally guiding the body portion of a tie to corresponding shoulders on said wheels and an end portion thereof to said vise.

27. In a machine for making wire bale ties, a rotary shaft, a plurality of shouldered wheels, and a vise on said shaft, the said vise having arms radial to said shaft, means for laterally guiding the body portion of a tie to corresponding shoulders on said wheels and the end portion thereof to said vise, and means for preventing said tie meeting said vise arms during the revolution of said vise.

28. In a machine for making wire bale ties, a rotary shaft, a plurality of shouldered wheels and a vise on said shaft, the said vise having arms radial to said shaft, means for laterally guiding the body portion of a tie to corresponding shoulders on said wheels and the end portion thereof to said vise and means for positively moving said end portion into position between said vise arms.

29. In a machine for making wire bale ties, a mechanism for forming an engaging part at one end of the tie, a mechanism for forming an engaging part at the other end of the tie, means for moving said tie laterally to said mechanisms and means for throwing one of said mechanisms out of operation.

30. In a machine for making wire bale ties, a mechanism for forming an engaging part at one end of the tie, a mechanism for forming an engaging part at the other end of the tie and means for throwing both of said mechanisms simultaneously out of operation.

31. In a machine for making wire bale ties, a mechanism for forming an engaging part at one end of the tie, a mechanism for forming an engaging part at the other end of the tie, means for moving said tie laterally to said mechanisms and means for throwing both of said mechanisms simultaneously out of operation.

32. In a machine for making wire bale ties, a mechanism for forming a cross head at one end of the tie, a mechanism for forming an eye at the other end of said tie and means for throwing said cross head mechanism out of operation.

33. In a machine for making wire bale ties, means for simultaneously forming by twisting an eye at each end of the tie wire; the direction of twist at one eye being opposite in direction to that of the other eye.

34. In a machine for making wire bale ties, means for simultaneously forming an eye at one end of the tie wire and a hook at the opposite end.

35. In a machine for making wire bale ties, means for simultaneously forming an eye at one end of the tie wire and, at the other end, a cross head adapted to engage with said eye.

36. In a machine for making wire bale ties, mechanism for forming a bight and a hook at one end of a tie, mechanism for simultaneously forming eyes at both ends of said tie, and mechanism for compressing the eye formed from the bight aforesaid to predetermined shape.

37. In a machine for making wire bale ties, means for bending over the end of a tie to form a bight, means for forming a hook in the standing part of said tie, means for grasping both parts of said tie and means for rotating said bight to form an eye.

38. In a machine for making wire bale ties, a grasping device for the tie, means for forming a bight and a hook in the portion of the tie protruding beyond said grasping device and means for carrying the bent over part of said bight into said grasping device.

39. In a machine for making wire tie cross heads of substantially the shape herein set forth, means for first producing the hook part of said cross head and means for subsequently producing the strut portion.

40. In a machine for making wire tie cross heads of substantially the shape herein set forth, means for first producing the hook part of said cross head and means for bending back the end portion of said tie beyond said hook to lie parallel with the standing part of the tie.

41. In a machine for making wire tie cross heads of substantially the shape herein set forth, means for first bending the tie near its end to form a hook, means for bending back the end portion of said tie beyond said hook to lie parallel with the standing part of the tie and means for twisting together the said bent over and standing parts.

42. The combination of a rotary plate, an axially disposed pin on the face thereof, a pin eccentrically disposed on said face, means for introducing a tie between said pins and a bending arm rotary on an axis parallel to the axis of rotation of said plate: the said parts being constructed and arranged so that on the rotation of said plate in a given direction said eccentric pin carries the tie around the axial pin to form a hook and said bending arm in rotating engages the end portion of said tie beyond said hook and bends said end portion around said eccentric pin.

43. The combination of a rotary plate, an axially disposed pin on the face thereof, a pin eccentrically disposed on said face, a second pin eccentrically disposed on said face at a further distance from said axial pin than said first named eccentric pin, means for introducing a tie between said axial pin and said nearer eccentric pin and a bending arm rotary on an axis parallel to the axis of rotation of said shaft: the said parts being constructed and arranged so that, on the rotation of said plate in a given direction, said nearer eccentric pin carries the tie around the axial pin to form a hook and said bending arm in rotating engages the end portion of said tie beyond said hook and bends said end portion around both eccentric pins.

44. In a machine for making wire bale ties, means for forming an eye at the end of a tie, a revolving support for said tie, and pivoted jaws for laterally compressing said eye.

45. In a machine for making wire bale ties, two plates movable toward and from one another in the same plane, means for forming an eye on the end of a tie and means for moving said eye between said plates to be compressed between the edges thereof.

46. In a machine for making wire bale ties, two plates movable toward and from one another in the same plane, means for forming an eye on the end of a tie, means for moving said eye between said plates and means for guiding said eye into position to be laterally compressed by the edges of said plates.

47. In a machine for making wire bale ties, means for forming an eye on the end of a tie, two pivoted jaws constructed to compress said eye laterally, and, in each jaw, a former plate for shaping the eye and a finger plate: the fingers of the finger plate of one jaw being constructed to enter between the fingers of the finger plate of the other jaw.

48. In a machine for making wire bale ties, means for forming an eye on the end of a tie, two pivoted jaws constructed to compress said eye laterally, and, in each jaw, a former plate for shaping the eye and two finger plates disposed respectively on each side of said former plate: the fingers of the finger plates of one jaw being constructed to enter between the fingers of the corresponding finger plates of the other jaw.

49. In a machine for making wire bale ties, means for forming an eye on the end of a tie, two pivoted jaws constructed to compress said eye laterally, and in each jaw a former plate for shaping the eye, and means for guiding the eye to position to be acted on by said former plates.

50. In a machine for making wire bale ties, means for forming an eye on the end of a tie, two pivoted jaws constructed to compress said eye laterally and, in each jaw, a former plate for shaping the eye and two finger plates disposed respectively on each side of said former plate: the fingers of the finger plates of one jaw being constructed to enter between the fingers of the corresponding finger plates of the other jaw and the fingers of said finger plates being rounded at the sides of their extremities next to the former plate.

51. In a machine for making wire bale ties, an intermittently revolving vise for holding the tie during the forming of an engaging end thereon, and means for laterally moving said tie into said vise while said vise is at rest.

52. In a machine for making wire bale ties, an intermittently revolving vise for holding the tie during the forming of an engaging end thereon, a finger for moving said tie into said vise and a fixed stop limiting the inward movement of said tie.

53. In a machine for making wire bale ties, an intermittently revolving vise for holding the tie during the forming of an engaging end thereon, means for feeding the tie to a position in front of said vise and means for laterally moving said tie into said vise while said vise is at rest.

54. In a machine for making wire bale ties, an intermittently revolving vise for holding the tie during the forming of an engaging end thereon, a fixed support, means for feeding the tie to said support and in front of said vise, a finger, and means for raising said finger from a position below said platform to a position in front of said tie and then moving said finger to carry said tie into said vise.

55. The combination of a support, means for holding the tie on one side of said support, a mechanism for producing an engaging end on said tie normally disposed on the opposite side of said support, means for moving said engaging end producing mechanism to engage said tie, and means for operating said mechanism.

56. The combination of a support, means for holding the tie on one side of the support, a mechanism for producing an engaging end on said tie normally disposed on the opposite side of said support, means for moving said engaging end producing mechanism to engage said tie, means for operating said mechanism, and means for stripping said tie therefrom.

57. The combination of a support, means for holding the tie on one side of said support, a mechanism for producing a hook on the end of said tie normally disposed on the opposite side of said support, means for moving said hook-producing mechanism into position to engage said tie, and means for operating said mechanism to form said hook.

58. The combination of a support, means for holding the tie on one side of said support, a mechanism for bending over the end of the tie disposed on the same side of said support, a mechanism for producing a hook between said bent over portion and the body portion of said tie disposed on the opposite side of said support, means for moving said hook producing mechanism into position to engage said tie, means for operating said mechanism to form said hook, and means for operating said bending over mechanism.

59. In a machine for making wire bale ties, a feeding device for the wire, a support for said device, means for cutting the wire into tie lengths, a flexible tubular guide for the wire interposed between said feeding device support and said cutting means and means for detachably connecting said guide to said support.

60. In a machine for making wire bale ties, a feeding device for the wire, a support for said device, means for cutting the wire into tie lengths, a tubular guide in said support receiving the wire from said feeding device, a flexible tubular guide interposed between said first named tubular guide and said cutting device and means for detachably connecting said first named tubular guide to said supports.

61. In a machine for making wire bale ties, mechanism for forming a bight on the end of a tie, two pivoted grasping jaws constructed to receive said bight between them, means for transporting said tie from said bight forming mechanism to said jaws, and means for rotating said jaws to form said bight into a twisted eye.

62. In a machine for making wire bale ties, mechanism for forming a bight on the end of a tie, a longitudinally movable rotary shaft, two pivoted grasping jaws carried by said shaft, means for transporting said bight to position in front of said jaws, means for moving said shaft longitudinally to cause said jaws to receive said bight between them, means for closing said jaws and means for rotating said shaft to form said bight into a twisted eye.

In testimony whereof I have affixed my signature in presence of two witnesses.

WILLIAM D. FERRIS.

Witnesses:
JEANNIE HASTIE,
GERTRUDE T. PORTER.